(12) United States Patent
Macias

(10) Patent No.: US 11,940,103 B1
(45) Date of Patent: Mar. 26, 2024

(54) MULTICOLORED TUBE LIGHT WITH IMPROVED LED ARRAY

(71) Applicant: Colt International Clothing Inc., Santa Clarita, CA (US)

(72) Inventor: Guillermo Macias, Santa Clarita, CA (US)

(73) Assignee: COLT INTERNATIONAL CLOTHING INC., Santa Clarita, CA (US)

( * ) Notice: Subject to any disclaimer, the term of this patent is extended or adjusted under 35 U.S.C. 154(b) by 0 days.

(21) Appl. No.: 16/261,405

(22) Filed: Jan. 29, 2019

Related U.S. Application Data

(63) Continuation of application No. 15/476,410, filed on Mar. 31, 2017, now Pat. No. 10,197,224, which is a
(Continued)

(51) Int. Cl.
| | |
|---|---|
| *F21K 9/27* | (2016.01) |
| *F21K 9/278* | (2016.01) |
| *F21V 7/00* | (2006.01) |
| *F21Y 113/13* | (2016.01) |
| *F21Y 115/10* | (2016.01) |
(Continued)

(52) U.S. Cl.
CPC ............. *F21K 9/27* (2016.08); *F21K 9/278* (2016.08); *F21V 7/005* (2013.01); *H05B 45/20* (2020.01); *H05B 45/37* (2020.01); *F21Y 2113/13* (2016.08); *F21Y 2115/10* (2016.08); *H04N 23/56* (2023.01); *H04N 23/74* (2023.01)

(58) Field of Classification Search
CPC .......... F21K 9/27; F21K 9/278; H04N 5/2354
See application file for complete search history.

(56) References Cited

U.S. PATENT DOCUMENTS

| | | |
|---|---|---|
| 6,357,893 B1 | 3/2002 | Belliveau |
| 6,583,566 B1 | 6/2003 | Jin et al. |
(Continued)

FOREIGN PATENT DOCUMENTS

| | | |
|---|---|---|
| DE | 202009011476 | 2/2010 |
| WO | 2005/012997 | 2/2005 |
| WO | 2009/063520 | 5/2009 |

OTHER PUBLICATIONS

Dimmable High Power Par38 White + Blue LED Aquarium Reef Corals Grow Light Bulb, pp. 1-5, www.Amazon.com, May 23, 2012.
(Continued)

*Primary Examiner* — Eric T Eide
(74) *Attorney, Agent, or Firm* — Diederiks & Whitelaw, PLC.

(57) ABSTRACT

Apparatus and system for producing light using LED lighting with output within a predetermined desired color temperature range for commercial lighting uses which may be bicolor or may be multicolored. A preferred embodiment includes a first and second group of LEDs arranged in an alternating matrix configuration, each group of LEDs configured to produce light in a predetermined color temperature range. In a preferred embodiment, an LED light system includes a tubular LED lamp having substantially the same size and dimensions as a traditional fluorescent lamp tube and a control box for controlling power input and power gain to the first, second, or both groups of LEDs.

26 Claims, 16 Drawing Sheets

Related U.S. Application Data continuation-in-part of application No. 15/096,549, filed on Apr. 12, 2016, now abandoned, which is a continuation-in-part of application No. 13/896,868, filed on May 17, 2013, now Pat. No. 9,719,642.

(60) Provisional application No. 62/146,551, filed on Apr. 13, 2015, provisional application No. 61/648,554, filed on May 17, 2012.

(51) Int. Cl.
*H05B 45/20* (2020.01)
*H05B 45/37* (2020.01)
*H04N 23/56* (2023.01)
*H04N 23/74* (2023.01)

(56) References Cited

U.S. PATENT DOCUMENTS

| | | | |
|---|---|---|---|
| 6,720,745 B2* | 4/2004 | Lys | F21S 4/28 315/312 |
| 6,856,087 B2 | 2/2005 | Lin et al. | |
| 6,860,628 B2 | 3/2005 | Robertson et al. | |
| 6,923,548 B2 | 8/2005 | Lim | |
| 7,038,399 B2 | 5/2006 | Lys et al. | |
| 7,049,761 B2 | 5/2006 | Timmermans | |
| 7,114,830 B2 | 10/2006 | Robertson | |
| 7,178,941 B2* | 2/2007 | Roberge | G06F 3/1446 362/225 |
| 7,180,252 B2 | 2/2007 | Lys et al. | |
| 7,192,160 B2 | 3/2007 | Reiff, Jr. et al. | |
| 7,350,936 B2 | 4/2008 | Ducharme | |
| 7,476,003 B2 | 1/2009 | Kim | |
| 7,507,001 B2 | 3/2009 | Kit | |
| 7,646,029 B2 | 1/2010 | Mueller et al. | |
| 7,744,242 B2* | 6/2010 | Kramer | F21K 9/00 362/231 |
| 8,026,532 B2 | 9/2011 | Ansems | |
| RE43,017 E | 12/2011 | Belliveau | |
| 8,147,091 B2 | 4/2012 | Hsia et al. | |
| 8,203,260 B2 | 6/2012 | Li et al. | |
| 8,511,851 B2 | 8/2013 | Van de Ven et al. | |
| 8,668,361 B2 | 3/2014 | Hasnain | |
| RE44,903 E | 5/2014 | Belliveau | |
| 8,783,901 B2 | 7/2014 | Zoorob et al. | |
| 9,057,493 B2 | 6/2015 | Simon et al. | |
| 9,066,405 B2 | 6/2015 | Van De Ven | |
| 9,239,134 B1 | 1/2016 | Macias | |
| 9,719,642 B1 | 8/2017 | Macias | |
| 9,845,924 B1 | 12/2017 | Macias | |
| 10,197,224 B1 | 2/2019 | Macias | |
| 2003/0011538 A1* | 1/2003 | Lys | H05B 47/18 345/39 |
| 2003/0072156 A1 | 4/2003 | Pohlert et al. | |
| 2003/0076281 A1* | 4/2003 | Morgan | F21S 10/00 345/44 |
| 2004/0052076 A1 | 3/2004 | Mueller | |
| 2004/0095078 A1* | 5/2004 | Leong | F21K 9/27 315/291 |
| 2004/0105261 A1 | 6/2004 | Ducharme et al. | |
| 2004/0252501 A1* | 12/2004 | Moriyama | F21V 19/0025 362/238 |
| 2004/0257007 A1 | 12/2004 | Lys et al. | |
| 2005/0047134 A1 | 3/2005 | Mueller | |
| 2005/0128751 A1* | 6/2005 | Roberge | G06F 3/1446 362/276 |
| 2005/0264472 A1 | 12/2005 | Rast | |
| 2007/0228999 A1 | 10/2007 | Kit | |
| 2007/0258240 A1 | 11/2007 | Ducharme et al. | |
| 2007/0262732 A1 | 11/2007 | Shen | |
| 2008/0025019 A1 | 1/2008 | Kim | |
| 2009/0009092 A1 | 1/2009 | Routledge | |
| 2009/0052204 A1 | 2/2009 | Kawashima et al. | |
| 2009/0109668 A1 | 4/2009 | Isobe | |
| 2010/0102729 A1 | 4/2010 | Katzir et al. | |
| 2010/0102730 A1 | 4/2010 | Simon et al. | |
| 2010/0102960 A1 | 4/2010 | Simon | |
| 2010/0103659 A1 | 4/2010 | Chen | |
| 2010/0148673 A1 | 6/2010 | Stewart et al. | |
| 2010/0214779 A1 | 8/2010 | Kao | |
| 2010/0289428 A1 | 11/2010 | Frazier et al. | |
| 2010/0315001 A1 | 12/2010 | Domagala et al. | |
| 2011/0043137 A1 | 2/2011 | Negley et al. | |
| 2011/0058365 A1 | 3/2011 | Osawa | |
| 2011/0084608 A1 | 4/2011 | Lin et al. | |
| 2011/0149563 A1 | 6/2011 | Hsia et al. | |
| 2011/0163941 A1 | 7/2011 | Li | |
| 2011/0235318 A1 | 9/2011 | Simon et al. | |
| 2011/0285292 A1 | 11/2011 | Mollnow et al. | |
| 2012/0051042 A1 | 3/2012 | Artsyukhovich et al. | |
| 2012/0146503 A1 | 6/2012 | Negley et al. | |
| 2013/0127369 A1 | 5/2013 | Campbell et al. | |

OTHER PUBLICATIONS

Coloronix Colortainment! Controller Manual, by Coloronix, Inc., copyright notice 2011, 13 pages.
Final Report of Laboratory Evaluation of Light-Emitting Diode (LED) T8 Replacement Lamp Products, Lighting Design Lab, Pacific Northwest National Laboratory, Seattle Washington, May 2011; 51 pages.
Light-Based Technologies, Better Light, Facts about Dimming, www.LIGHTBASED.COM, as published in LED Professional Review, Jan./Feb. 2011, Issue 23, 7 Pages.
Coloronix Colorful Architectural Illumination, SCC6 Colortainment Ambx Controller, www.RGBW.COM, 1 page.
Houston Neal, Are LED Fluorescent Tubes Ready for Prime Time?, May 7, 2010, 5 pages.
CREE XLamp XP Data Sheet (CLD-DS20 Rev.6B), 2009-2011, 12 pages.
CREE XLamp MK-R LEDs Data Sheet (CLD-DS60 Rev. A) 2012, 19 pages.
Colt LED website selected pages, Authorized Distributors, 2019, 2 pages.
Answer to Amended Complaint, Case No. 2:17 -CV-07325 Ab, Feb. 23, 2018; 21 pages.
Kino Flo, 1994 Fluorescent Lightning System Catalog, 1994, 3 selected pages.
B&M Lighting & Universal Studios Partner on Mac Tech LED Lighting, Jun. 3, 2011, 3 pages.
Mike Wood, When White Light Isn't White, Spring 2008, 5 pages.
Steven Keeping, Identifying the Causes if LED Efficiency Droop, Oct. 10, 2011, 5 pages.
Steven Keeping, What's Next for High-Power LEDs?, Dec. 4, 2012, 8 pages.
Declaration of Frieder Hochheim in Support of Ex Parte Reexamination of U.S. Pat. No. 9,719,642, dated May 14, 2018, submitted in Reexamination Control No. 90/1014,146 (13 pages).
"MacAdam Ellipses: What are MacAdam Ellipses or color ovals?" Osram Sylvania, Westfield, in, 2000 (2 pages).
Cree, "Cree LED Components Overview," by Cree, Inc., Durham, NC, 2013, 301 pages.
U.S. Appl. No. 61/195,785, filed Oct. 10, 2008, Katzir, Wesley and Katzir, Omer, 62 bages.
"Color Quality of White LEDs," US Department of Energy (DOE), Washington, DC, Jan. 2008, 2 pages.
"Cree XLamp XHP35.2 LEDs Product Family Data Sheet," Cree, Inc., Durham, NC, 2018, 26 pages.
Minolta Color Meter IIIF manual, Minolta, Osaka, Japan, as posted Feb. 11, 2006 at www.butkus.org, 32 pages.
"Solid State Lighting Standards Update," Cree, Inc., Durham, NC, 2011, 29 pages.
"Industry News NEMA Publishes SSL Mar. 2011 High-Power White LED Binning For General Illumination," Light Directory, Oswego, IL, Mar. 31, 2011, 3 pages.
"NEMA publishes white-LED binning standard (SSL Mar. 2010)," LEDs Magazine, Tulsa, OK, Apr. 15, 2010, 2 pages.

(56) References Cited

OTHER PUBLICATIONS

Box, Harry C., Set Lighting Technician's Handbook, Fourth Edition, 2010, by Focal Press, Burlington, MA (USA), "Appendix I Gels and diffusions" (Table I.9), p. 544 (1 sheet total).
Operating Manual for Sekonic Prodigi Color C-500R/C-500, Sekonic Corporation, Tokyo, Japan, 2007, 57 pages.
"How LEDs Produce White Light," PhotonStar Lighting, http://www.photonstartechnology.com/learn/how_leds_produce_white_light, Accessed Oct. 22, 2018, 4 pages.
"The Craft of Lighting: Using Gels, " School Video News, Inc., http://schoolvideonews.com/Lighting/The-Craft-of-Lighting-Using-Gels, Accessed Oct. 14, 2018, 4 pages.
"LED lighting with incandescent spectrum?," Electrical Engineering Stack Exchange, https://electronics.stackexchange.com/questions/20757/led-lighting-with-incandescent-spectrum, Accessed Dec. 21, 2018, 5 pages.
"What You Need to Know About Continuous Lights and Their Color Paradox," Emerald Expositions, LLC, https://www.bdnonline.com/gear/techniques/video-filmmaking/need-know-continuous-lights-color-paradox/, Jul. 28, 2017, 8 pages.
"High-Power White LED Binning for General Illumination" NEMA Standards Publication SSL Mar. 2011, National Electrical Manufacturers Association 1300 North 17th Street, Suite 1752, Rosslyn, Virginia 22209, www.nema.org, 13 pages.
Henry Tran, UPSTO, Ex Parte Reexamination Decision on Request, Reexamination Control No. 90/014,150, Jul. 24, 2018, 27 pages.
Henry Tran, USPTO, Office Action in Ex Parte Reexamination, Reexamination Control No. 90/014,150, dated Nov. 21, 2018, 45 pages.
Henry Tran, USPTO, Notice of Intent to Issue a Reexam Certificate, Reexamination Control No. 90/014,150, dated Apr. 2, 2019, 11 pages.
USPTO, Reexamination Certification dated May 7, 2019, 4 pages.
Declaration of Frieder Hochheim in Support of Second Request for Ex Parte Reexamination of U.S. Pat. No. 9,719,642, Reexamination Control No. 90/014,371, Aug. 29, 2019, 8 pages.
Declaration of Steven Strong in Support of Second Request for Ex Parte Reexamination of U.S. Pat. No. 9,719,642, Reexamination Control No. 90/014,371, Aug. 30, 2019, 6 pages.
Declaration of Raymond Wolffe in Support of Second Request for Ex Parte Reexamination of U.S. Pat. No. 9,719,642, Reexamination Control No. 90/014,371, Aug. 30, 2019, 6 pages.
Request for Ex Parte Reexamination of U.S. Pat. No. 9,719,642, Sep. 4, 2019, 86 pages.
Box, Harry C., Set Lighting Technician's Handbook, Fourth Edition, 2010, cover page, title page, copyright page, Chapter 6 (pp. 119-149), p. 208, Chapter 10 (pp. 227-249) (total 58 sheets), by Focal Press, Burlington, MA (USA).
Weinert, Jonathan, LED Lighting Explained, entire book (total 68 sheets), 2010, by Philips Solid-State Lighting Solutions, Inc., Burlington, MA (USA).
Crockett, Will, Color Correction Guide, v3.4, 10 pages, accessed Nov. 20, 2018, downloaded from http://www.photoethnography.com/ClassicCameras/manuals/MinoltaColorMeterII/CCguide34.pdf, Arroyo Grande, CA (USA).
Brown, Blain, Cinematography Theory & Practice, Cover page, copyright page, and p. 100 (3 sheets total), 2015, by Routledge, New York, NY (USA).
Butkus, M., Online Manual for Minolta Color Meter II, 20 pages, accessed Nov. 20, 2018, downloaded from https://www.butkus.org/chinon/minolta/minolta_color_meter_ii/minolta_color_meter_ii.htm, by M. Butkus, High Bridge, NJ (USA).
Official Action dated Oct. 17, 2018, Reexamination No. 90/014,146, filed May 30, 2018 (47 pages).
Official Action dated Nov. 21, 2018, Reexamination No. 90/014,150, filed Jun. 12, 2018 (45 pages).
Kris Malkiewicz and M. David Mullen, "Cinematography," published 2005, 5 pages.
U.S. Department of Energy, "Solid-State Lighting Technology Fact Sheet," Jan. 2012, 4 pages.
Richard Comerford, 1'LED Specs—Understanding the Color White, May 10, 2011, 4 pages.
Cree, "LED Color Mixing: Basics and Background," App. Note: CLD-AP38-Rev. 0, 2010, 27 pages.
Steven Keeping, "Whiter, Brighter LEDs," Aug. 30, 2011, 6 pages.
Steven Keeping, "Defining the Color Characteristics of White LEDs," Apr. 23, 2013, 6 pages.
Official Action dated Oct. 17, 2018, U.S. Pat. No. 9,719,642 to Macias, Reexamination Proceeding, 47 pages.
Reexamination Decision on Request dated Jul. 24, 2018, U.S. Pat. No. 9,845,924, Reexamination Proceeding, 27 pages.
Official Action dated Dec. 16, 2020, U.S. Pat. No. 9,719,642 to Macias, Reexamination Proceeding (Second), 35 pages.
Reexamination Request dated Jul. 24, 2018, U.S. Pat. No. 9,719,642 dated Sept. 4, 2019, Reexamination Proceeding (Second) No. U.S. Appl. No. 90/014,371, 86 pages.
Declaration of Frieder Hochheim, Aug. 29, 2019, as submitted in Reexamination Proceeding (Second) No. U.S. Appl. No. 90/014,371, 8 pages.
Declaration of Steven Strong, Aug. 30, 2019, as submitted in Reexamination Proceeding (Second) No. U.S. Appl. No. 90/014,371, 6 pages.
Declaration of Raymond Wolffe, Aug. 30, 2019, as submitted in Reexamination Proceeding (Second) No. U.S. Appl. No. 90/014,371, 6 pages.
John M. Hotaling, II, UPSTO, Order Granting Request for Ex Parte Reexamination, Reexamination Control No. 90/014,146, Jun. 21, 2018, 15 pages.
John M. Hotaling, II, USPTO, Office Action in Ex Parte Reexamination, Reexamination Control No. 90/014,146, dated Oct. 17, 2018, 47 pages.
John M. Hotaling, II, USPTO, Ex Parte Final Action, Reexamination Control No. 90/014,146, dated Mar. 27, 2019, 58 pages.
John M. Hotaling, II, USPTO, Notice of Intent to Issue a Reexam Certificate, Reexamination Control No. 90/014,146, dated May 23, 2019, 7 pages.
USPTO, Reexamination Certificate 11548th Issued Jul. 29, 2019 for U.S. Pat. No. 9,719,642 pages.
USPTO, Requestors Petition for Review of Examiners Determination on Request for Reexamination Filed Under 35 USC 302, by Craig Bailey, Reexamination No. U.S. Appl. No. 90/014,371, filed Nov. 8, 2019, 17 pages.
USPTO, Requestors Petition for Review of Examiners Determination on Request for Reexamination Filed Under 35 JSC 302, by Craig Bailey, Reexamination No. U.S. Appl. No. 90/014,372, filed Nov. 8, 2019, 18 pages.
Order Granting Reexamination Request, Control No. U.S. Appl. No. 90/014,371, USPTO, Oct. 8, 2019, 21 pages.
Order Granting Reexamination Request, Control No. U.S. Appl. No. 90/014,372, USPTO, Oct. 16, 2019, 19 pages.
Declaration of Frieder Hochheim in Support of Second Request for Ex Parte Reexamination of U.S. Pat. No. 9,845,924, Reexamination Control No. 90/014,372, Aug. 29, 2019, 8 pages.
Declaration of Steven Strong in Support of Second Request for Ex Parte Reexamination of U.S. Pat. No. 9,845,924, Reexamination Control No. 90/014,372, Aug. 30, 2019, 6 pages.
Declaration of Raymond Wolffe in Support of Second Request for Ex Parte Reexamination of U.S. Pat. No. 9,845,924, Reexamination Control No. 90/014,372, Aug. 30, 2019, 6 pages.
Request for Ex Parte Reexamination of U.S. Pat. No. 9,845,924, Sep. 4, 2019, 87 pages.
Inter Partes Review Petition of U.S. Pat. No. 10,566,895, Feb. 17, 2023.
Inter Partes Review Petition of U.S. Pat. No. 10,411,582, Feb. 17, 2023.
Inter Partes Review Petition of U.S. Pat. No. 10,197,224, Feb. 17, 2023.
User Manual for Wireless Pixel Tube, v3.2.20, Astera LED Technology, Astera LED Technology GmbH, Nahe, Germany, Jul. 23, 2010, 12 pages.

(56) References Cited

OTHER PUBLICATIONS

Declaration of Fred Holmes in Support of Case IPR2023-00611 for U.S. Pat. No. 10,197,224 dated Feb. 16, 2023, 227 pages.

* cited by examiner

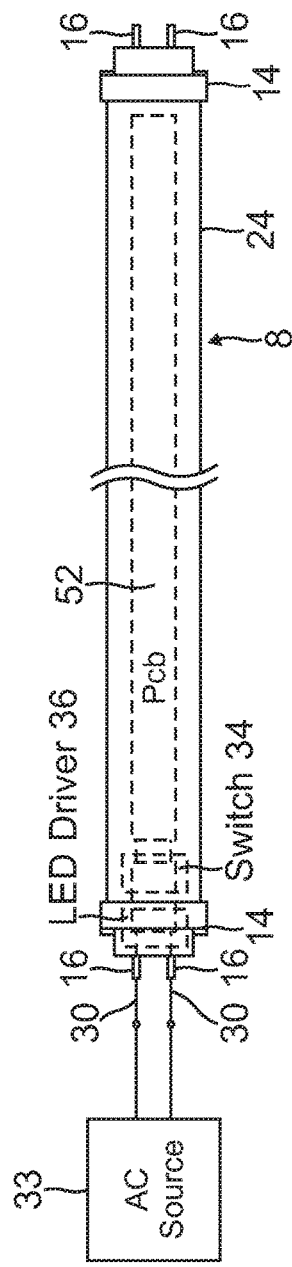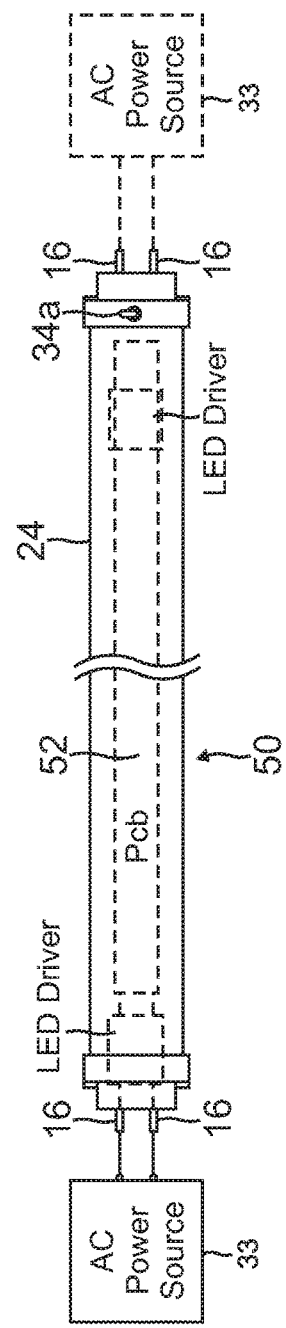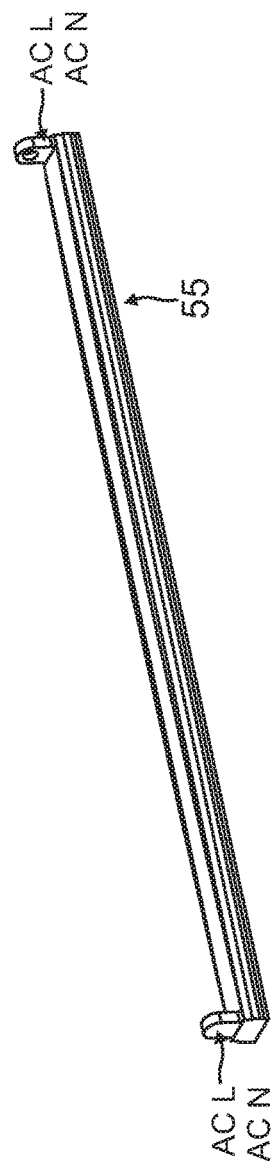
FIG. 3
FIG. 4
FIG. 4A

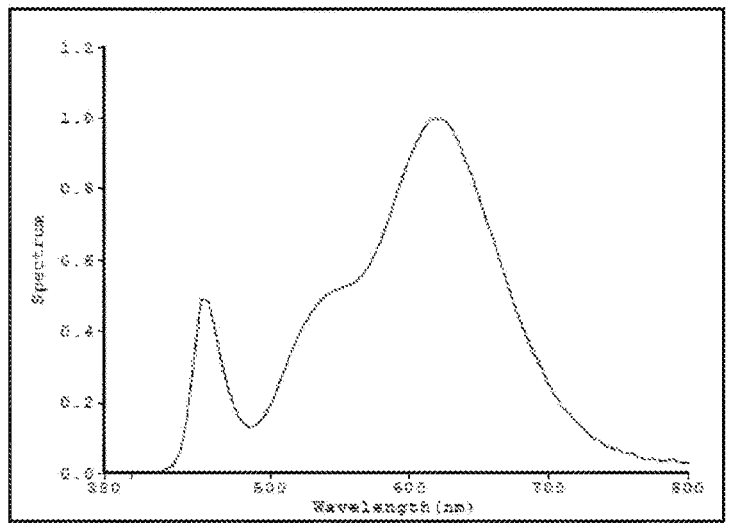 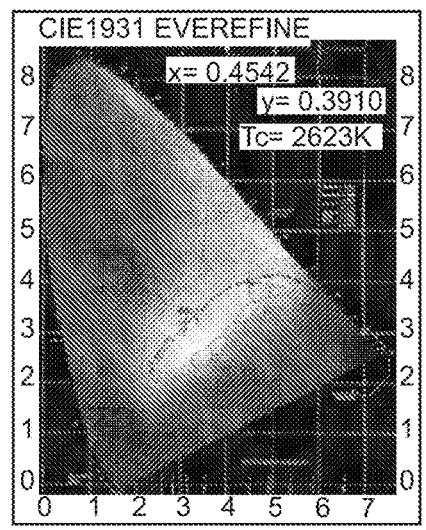
FIG. 17A      FIG. 17B
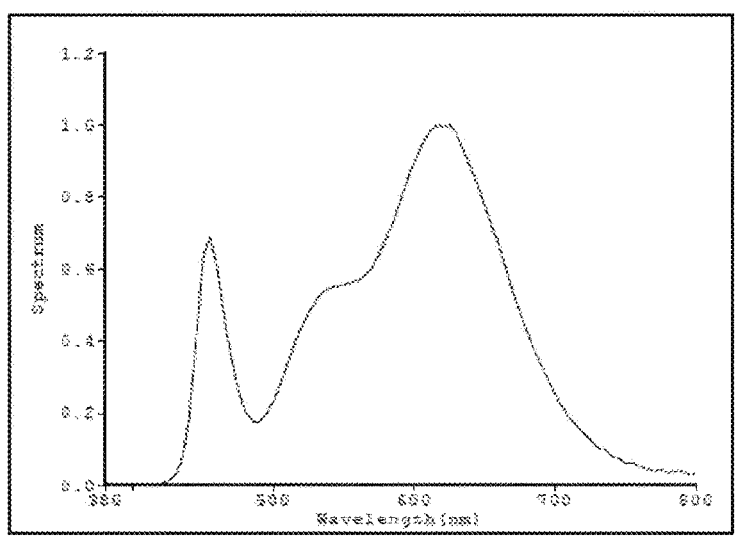 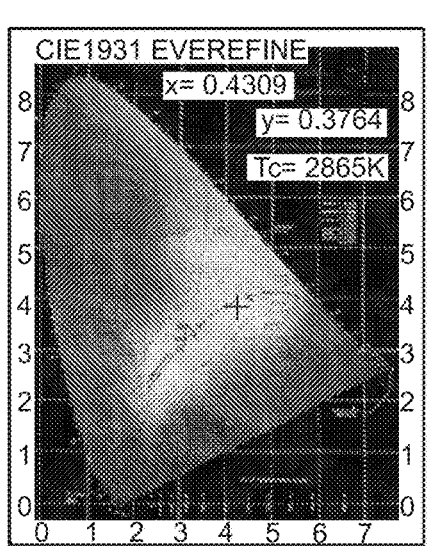
FIG. 18A      FIG. 18B

MULTICOLORED TUBE LIGHT WITH IMPROVED LED ARRAY

CROSS REFERENCE TO RELATED APPLICATION

This nonprovisional patent application claims priority from and is a continuation of pending U.S. patent application Ser. No. 15/476,410, filed Mar. 31, 2017, which is a continuation-in-part and claims priority of pending U.S. patent application Ser. No. 15/096,549, filed Apr. 12, 2016, which is a nonprovisional application claiming priority from provisional application Ser. No. 62/146,551, filed Apr. 13, 2015, and is also a continuation-in-part of and claims priority from pending U.S. patent application Ser. No. 13/896,868, filed May 17, 2013, which is a nonprovisional application of, and claims priority from U.S. Provisional Application No. 61/648,554, filed on May 17, 2012, all of which are incorporated by reference herein.

BACKGROUND

Field of the Invention

The present invention relates to a lighting system comprising a tube light with an improved LED array capable of producing light within at least two desired predetermined color temperature ranges, and preferably all colors in a color wheel.

Description of the Related Art

Fluorescent light bulbs or lamps have been used for a long time for various artificial lighting purposes, from residential to commercial lighting. Fluorescent lamps are gas-discharge lamps that use electricity to excite mercury vapor to produce short-wave ultraviolet light that then causes a phosphor to fluoresce, producing visible light. Many fluorescent bulbs are made in tubular form which contains the mercury vapor. As a result, larger fluorescent lamps require large elongated tube lamps to produce the desired amount of light.

While larger fluorescent lamps have been used mostly in commercial buildings or institutional buildings, they also have applications in the lighting industry such as TV, stage, auditorium, and/or film studio use, and/or other venues. However, fluorescent lamps must be used with caution in the lighting industry as the color temperature of fluorescent lamps may create unwanted visual effects for the viewer. Color temperature is a characteristic of visible light measured by the temperature of an ideal black body radiator that radiates light of comparable hue to that of the light source. Color temperature is conventionally stated in the unit of absolute temperature, Kelvin (K). Color temperatures over 5,000K are considered "cool" colors (blue-ish white), while lower color temperatures of 2,700 to 3,300 (or even lower) are considered "warm" colors (yellowish white through red).

The spectrum of light emitted from a fluorescent lamp is the combination of light directly emitted by mercury vapor, and light emitted by the phosphorescent coating. The spectral lines from the mercury emission and the phosphorescence effect give a combined distribution of light that is different from those produced by incandescent sources. Colored objects are perceived differently under light sources with differing spectral distributions. For example, some people find the color rendition produced by some fluorescent lamps to be harsh and displeasing, sometimes giving a greenish hue to skin tones giving people a sickly or unhealthy appearance. In addition, when used for lighting TV, studio, or film productions, the color temperature of the lighting often may need to be changed in order to match the scene or mood of the production. For example, recreating a scene taking place under sunlight with blue skies may require a color temperature of 9000 to 12000 Kelvin (K), while a scene taking place at sunrise or sunset may require a lighting color temperature of 3200 K or even substantially lower than 3200 K. The two most frequently used and desired color temperature ranges in the lighting industry for stage and set lighting have been found to be, for example, 3050 to 3300 K for tungsten (warm white), and, for example, 5400 to 5600 K for daylight (cool white). Some system designers may prefer a somewhat a more narrow or wider ranges (e.g., warm white range down to 2700 K, and so on). These ranges represent ideal color temperature ranges for producing ideal lighting for TV, photography and film studio scenarios.

In such uses where accurate and suitable lighting color temperature is vital, lighting "gels" are often used in conjunction with fluorescent lamps to produce the desired color temperature. These lighting gels often consist of colored tube shaped sleeves made from a semi-transparent material to give the light the desired color effect. Although allowing for modification of the color temperature of light, techniques such as using color gels do not provide an easy method to change the lighting and so cause significant delays in production. For example, if shooting a daytime scene, production workers would need to manually remove and replace all of the colored gels on the fluorescent lamps being used, often a daunting task when faced with several banks of lamps, each bank consisting of numerous individual fluorescent lamps. Or without colored gels, a lighting crew must continually change the fluorescent lamps between daylight white (or day white) colored lamps and tungsten (or warm white) colored lamps, or if desired, other types of white/light or colored lamps.

Alternatively, LED (light emitting diode) lighting has been developed and has recently gained popularity. Since LEDs use very little energy and have a relatively long life, in recent years it has been popular to replace existing fluorescent bulbs with LEDs. LEDs present many advantages over incandescent or fluorescent light sources including lower energy consumption, longer lifetime, improved physical robustness, smaller size, and faster switching. There are two primary types of LED lighting used to create white light. One is to use individual LEDs that emit three primary colors (red, green, and blue) and mix the colors to form white light. The other is to use a phosphor material to convert monochromatic light from a blue or ultraviolet LED to broad-spectrum white light, also referred to as phosphor based LEDs.

In order to match the tubular form of a fluorescent bulb, LEDs may be placed within a tube having the same form factor as a fluorescent lamp, such as a T8 or T12 size fluorescent bulb. One such bulb is made by Dialight and is called DuroSite™. For example, in size T8, the bulb in one form uses SMD LEDs in a four foot long tube and provides 1500 Lumens of Natural White light, using 17 Watts, 300 LEDs, with 90V-277V, and is ETL/UL Approved. However, such existing products cannot provide a lighting solution to create two different predetermined color temperature light outputs suitable for use in the stage lighting industry, for uses such as TV, stage, photography and studio lighting. Sufficient intensity of the light is preferably at least 1000 lux for such an application.

In U.S. Pat. No. 8,203,260 to Li et al discloses an LED light (not made in a tubular form factor of a fluorescent light) and having color temperature which is tunable by blending adjacent pairs of LEDs by dimming one or both LEDs a customized amount to achieve the desired color. The control is complex and the temperature of the cold light is relatively high. The lighting is intended for street lights, vehicle headlights, and/or for other lights subject to moisture, fog, dust or smoke situations. These are clearly not applications that a tubular fluorescent form factor would be suitable. As is evident from Li's desired applications, a fog or moisture sensor or other sensor is preferably used with the device. Since the drive current to each of the different color LEDs must be reduced to achieve the desired blend of light, the intensity is not only reduced but is expected to vary quite a bit from color to color. There is no single source mode, and the light output is not suitable for studio use for several reasons. For example, the light output at the high temperature range may be over 6000 K, which is too harsh. Also, the light is not disclosed to be broad spectrum, and CRI and green levels that meet studio requirements are not disclosed. Further, Li's applications such as street light and headlight need extremely high power and therefore will generate a lot of excess heat.

In U.S. Patent Application No. 2003/0072156 to Pohlert et al discloses a big light frame in the form of a wheel with a central opening for a camera. Daylight and tungsten LEDs may be mounted on the frame, and their relative intensities may be controlled. As stated in Pohlert's background section, "Proper illumination is necessary when filming movies, television shows, or commercials, . . . " (See, para. 0006) Perhaps most important, Pohlert states that "Fluorescent bulbs are generally tube-shaped, which can limit the lighting configuration or mounting options." (See, para. 0012) Pohlert does not want to use a fluorescent tube form factor because of the limited flexibility. FIG. 34 of Pohlert shows two different LED colors (tungsten and daylight LEDs 3403, 3404, respectively) that may be mounted on a ring frame or on a large rectangular frame (See, FIG. 35). Pohlert, while obviously aware of a fluorescent form factor, disfavors the fluorescent form factor because of the limited options when used with LEDs.

While LEDs have certain advantages, they also pose a number of design challenges that are well recognized by film and television lighting equipment designers. These challenges include, among other things, heat dissipation characteristics and electrical operation and control. Such challenges are particularly difficult in the field of entertainment lighting where color quality and consistency is of critical importance. Because LED color and brightness levels vary with temperature and age, larger mounting panels for heat dissipation has been seen as being required, given the critical nature of lighting sources "for lighting a subject for film, photography or video," which is the general field of the present invention.

As compared to Pohlert, a designer would have extremely limited circuit board space with the T12 or T8 linear tube form factor (no more than a one-and-a-half inch width) for heat sinking and for placing LEDs of different color temperatures.

As but one example, variable color temperature luminaire (with double (or more) the number of LEDs) can require up to twice (or more) the circuit board mounting space to accommodate electronically "selecting" between its sets of "predetermined" (e.g., daylight and tungsten) white light LEDs, yet such conventional T12 and smaller "tube" form factors have extremely limited circuit board topographical space for such multiple LED placement, as well as extremely limited available space for thermal heat sinking. For example, the long-standing T8 tube form factor has a mere one inch (1") system diameter, and T12 has a mere one and a half inch (1.5") system diameter, which would be perceived as highly problematic for a designer doing multiple color emitter film/TV luminaire.

A film/TV/video luminaire designer with ordinary skilled in the art readily understands how critical thermal design and management is. Without proper thermal design, the luminaire will suffer with inconsistent light level output (resulting in unintentional changes in light level output that can be catastrophic in a filming environment), undesirable color shifting, inconsistent color uniformity, reduced fixture life, and phosphor breakdown. In particular, for example, circa 2012, it would have been counterintuitive for a luminaire designer with ordinary skill in the art who is designing a multi-spectral LED emitter lighting fixture for film/TV/video usage (e.g., Bi-Color, RGBW, etc.) to choose such a highly restrictive linear tube form factor. In contrast to this narrow/restrictive tube form, an artisan of ordinary skill would naturally look instead to a larger form factor such as flat panels as taught by Pohlert, which provide, for example, far more circuit board "real estate" (room) to create a precision high-output light source with vastly superior "LED spacing" thermal management properties. Such an optimized, light source can also provide higher light output levels and avoid "active" fan cooling. Avoiding active fan cooling (a highly desirable feature in a filming environment because sound is also normally recorded at the same time as filming) by better spreading apart the LEDs from one another without fan noise. Moreover, linear tube light sources typically have encapsulated clear or diffused outer sleeves, which only serves to further trap additional heat within their already thermally challenged narrow tube structures.

In light of such major design concerns, the skilled artisan designing a bi-color film/TV light with a high quantity of LEDs would not look in the direction of an "elongated and narrow surface" form factor. For example, in 2012 the industry's leading provider of fluorescent film/TV lighting fixtures, Kinoflo (based in Burbank, Ca.), abandoned the form factor of linear tubes when designing its own bi-color white light LED "Celeb" lighting fixture. Instead it chose the far more spacious "flat panel" form factor.

The "known disadvantages" of the legacy linear tube form are not limited to just thermal management issues. For example, it will also be readily understood by one of ordinary skill in the art, that LEDs exhibit maximum efficiency only when run at very low current, as the electrical-to-optical power conversion efficiency drops dramatically with higher LED input current. This so-called efficiency drop or droop represents a key challenge to solid-state lighting designer. System designers use a higher quantity of LEDs and drive them at fractionally lower currents in order to gain greatly enhanced system efficiency and avoid the efficiency droop. Yet such a standard designer's constraint of using a high quantity of LEDs driven at low current is not possible within the extremely limited topographical space available within narrow linear tube formats such as T8 and T12. Restated, properly designed luminaires utilizing "more" LEDs with the same overall system power therefore result in more light efficacy (i.e., more lumens per watt) and better system reliability.

In addition, higher lumens-per-watt are needed as many times luminaires are required to match or exceed local ambient light levels when filming in order to produce professionally looking imagery. The following analogy may help illustrate this point. Consider the relative fuel economy of a car travelling at 55 mph vs a car travelling at travelling at 100 mph. As is readily understood, the car travelling at 55 mph will have substantially better fuel economy. It is the same in the LED world, where driving LEDs closer to their maximum current results in less lumen efficiency (less lumens-per-watt). In addition to being less efficient, operating LEDs at higher electric currents creates higher heat levels which those of ordinary skill in the art avoid because high heat levels compromise consistent light levels, color fidelity and lifetime of the LED.

What is desired is a lighting solution suitable for the lighting industry implementing the advantages of LED lights which allows for evenly dispersed light controllable within specific color temperature parameters without the need to physically switch out colored gels or lamp modules to achieve the desired color temperature light. It is also desirable to maintain the shape and interface of a traditional fluorescent lamp so as to allow maximum usability in the lighting industry without requiring expensive and time consuming equipment overhaul and upgrades.

SUMMARY OF THE INVENTION

Some exemplary embodiments of the invention include apparatus and system for producing light using LED lighting with outputs of at least two predetermined desired color temperatures. In one preferred embodiment, an LED light system includes a tubular LED lamp having substantially the same physical form as a traditional fluorescent lamp tube. The term "LED lamp" or "bulb" as used herein refers to a unitary light module construction utilizing LEDs with a physical shape and form the same as or substantially similar to a traditional fluorescent lamp tube, such as a T8 or T12 form factor.

A preferred embodiment further includes a plurality of LEDs arranged in a matrix formation on a surface provided within the LED lamp. The term "LEDs", as used herein refers to a single light source utilizing LED lighting technology, including a single LED unit, as well as a single grouping having or consisting of trichromatic LED units configured and arranged to work together to produce a single color (for example, a grouping of red, green, and blue LED bulbs configured to create white light.)

In the preferred embodiment, the LEDs may be arranged in arrays of four emitters or lamps preferably in a tube in one direction perpendicular to a main axis of the tube and facing in one direction, by many rows of such LEDs, e.g., at least four rows (for a total of sixteen LEDs). A preferred embodiment may include at least ten or twenty rows of LED arrays, or even twenty-five or more rows (equaling 100 or more LEDs). The number of rows may vary depending on the size of the LED lamp used for the lighting fixture. For example, in a three foot long tube there will be fewer LEDs than a four foot long tube light device, in a linear variance given the same diameter and number of LEDs in each LED array.

A preferred embodiment has a mixture of at least two types of LEDs interspersed in one matrix arrangement. A first type of LED may be configured to produce light in a first predetermined color temperature range, and a second type of LED may be configured to produce light in a second predetermined color temperature range. In the preferred embodiment, the first predetermined color temperature range extends, for example, between 5400 and 5600 K for rendering daylight color temperature, and the second predetermined color temperature range extends, for example, between 3050 and 3300 K for rendering tungsten color temperature light. The color ranges may be predetermined based on the desirable appearance of a person's skin during commercial video or image recording.

The first and second types of LEDs are preferably arranged within the matrix in a checkerboard pattern, a row of LEDs alternating between the first type and the second type of LEDs. Another preferred embodiment may include various other uniform arrangements having dispersed and/or arrayed patterns of the two types of LEDs within the matrix. In all embodiments, the arrangements of the two types of LEDs are predetermined such that the grouping of the first type of LEDs and the grouping of the second type of LEDs each provide an evenly dispersed light. Maximum driving current to each of the first type of LED, when the LED bulb is on (all first type of LEDs are lit), is preferably the same or substantially the same as driving current to each second type of LED when the second type of bulb is on (all second type of LEDs are lit).

Preferably the intensity output is at least about 1000 lumens (e.g., at four feet). A preferred embodiment may also include a first driver and a second driver for providing driving currents to trigger the first and second types of LED bulbs respectively. The system may also include a controller connected to the at least two drivers for generating a plurality of output signals and outputting the output signals to the drivers in response to a predetermined setting by the user. In another embodiment, there are multiple lamps for stage or set lighting. In a further embodiment, there is a control unit for selectively turning on and off the lamps and, preferably, for selectively dimming and for selecting between the first and second type of LEDs, e.g., daylight (cool white light) and tungsten (warm white light).

Because the lamps are LEDs, no ballast is needed.

Moreover, in another embodiment, instead of providing light of two colors, the two colors may be provided along with other colors to produce a multiplicity of colors. In this situation, it is most preferred to use four (or more) LEDs or LED chips per column of LEDs in the array of LEDs or LED chips. There may be the same number of rows of LEDs or LED chips as in the previous embodiment, or some other desired number.

In another variation of the invention, at each end of the tubular LED lights, there are end caps, which are provided with male and/or female USB connectors or DMX connectors or other equivalent connector capable of carrying a DMX signal or signals, e.g., CAT5 or five pin XLR. The connectors may be connected to the ends of the light tubes by cords, or may be formed in the ends of the light tubes, or one connector, such as the female connector, may be corded and the other, such as the male connector, may be formed in the ends. Also, the connectors could just be at one end.

The USB connection(s) may provide the power source. Alternatively, the power source may be as in the first embodiment, or may be provided by one voltage adaptor/LED driver that contains a cord and plug, and an adaptor piece designed to connect to (electrically receive) two conductive prongs extending from the end of the tubular LED lights (like in a standard elongate fluorescent light bulb).

In a most preferred embodiment, the LEDs or LED chips may be controlled by digital signals transmitted along USB cable to the USB connector(s) on the tubular LED lights. These signals preferably correspond to DMX lighting control signals sent from a standard DMX control signal source, e.g., a computer console such as GrandMA2 control console and/or ETC Gio or ETC Ion, or Whole Hog 4, or other comparable lighting control boards with color picker software and can send DMX signals or other comparable control signals may be used if the signals from the device's color picker software are not DMX, then they may be converted into DMX signals using standard software, via an App on a smart phone or tablet computer, or software using a laptop or desktop computer, or other suitable digital device.

On the lighting tube, in addition to the LED array, there is an LED driver or drivers (which is or are connected to each row of LEDs and/or LED chips to provide the appropriate DC voltage to drive the LEDs and/or LED chips in each row), an optional microprocessor (receiving the DMX or other control signals) and controlling the LED driver or drivers, and if line voltage is used, a transformer or AC to DC converter.

A control for providing signals to the LED driver or drivers is set so that in response to a signal level such as a DMX signal in a designated channel or channels, one of preferably five LED colors in an RGBAW array (red, green, blue, amber and white, preferably) will light at a desired level between zero (off) and 255 (full on). The driver or drivers are built to respond in increments of a little under 0.4% (rather than standard 1% increments) so that there are 255 or 256 increments (corresponding to the different values of an 8 bit DMX signal). By use of the RGBAW LEDs, the matrices of such LEDs as disclosed herein, and the LED driver increments in a little under 0.4%, the system can provide all 255 colors of a standard entertainment industry lighting color wheel.

In a variation, there is also an on-board DMX decoder (or code) having a control knob (on the housing behind of the lighting tube that enables entry of a DMX code also known as a DMX address or DMX addressing (between 0 and 512 channels although actually can enter up to 999 or any other desired code). This enables changing the code or channel of the lighting tube without having to replace the lighting tube.

In a further embodiment, the lighting tube may be powered by a battery, which battery may be onboard the lighting tube or physically fixed thereto.

In a further version of the invention, there may be a wireless signal receiver on board the lighting tube, and the control signals may be provided wirelessly, e.g., by Bluetooth or other wireless protocol.

BRIEF DESCRIPTION OF THE DRAWINGS

FIG. 3 is a schematic view of a bulb of the present invention.

FIG. 4 is a schematic view of another embodiment of the present invention.

FIG. 4A is a view of a fluorescent bulb receptacle which may be used with a bulb of the present invention.

FIG. 17A shows the spectrum output from a 2700K LED.

FIG. 17B shows a measured chromaticity diagram from the 2700K LED.

FIG. 18A shows the spectrum output from a 3200K LED.

FIG. 18B shows a measured chromaticity diagram from the 3200K LED.

DESCRIPTION

Bicolor Embodiment(s)

In general, various embodiments of the invention relate to LED lighting systems configured to produce at least two different ranges of color temperature light, utilizing a first type of LED bulbs configured to provide a first color temperature range light and a second type of LED bulbs configured to provide a second color temperature range light. Embodiments of the invention may be used in conjunction with lighting fixtures and infrastructure traditionally used in conjunction with fluorescent light tube lamps. Alternatively, embodiments may be used with other mounting devices. Additionally, exemplary embodiments of the invention include a controller and a control interface box through which an operator is able to control the output signal output to the drivers of the LEDs. Embodiments may be powered by AC and other embodiments may be DC power. In either of these embodiments, there may be control signals received by the units as well. In other versions, the LED lamp preferably may include a switch determining the grouping of LEDs powered by the voltage, controllable by the user via the control interface box. In yet another embodiment, the user may be able to dim the output signal to the first type of LEDs and second type of LEDs Preferably, the first type of LEDs are daylight white and the second type of LEDs are tungsten or warm white light.

Figure 1A:
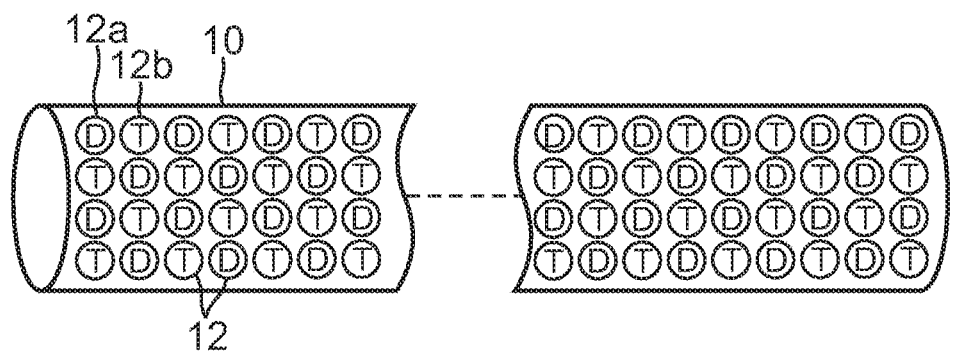
FIG. 1A is a schematic view of a bulb in accordance with one embodiment, showing a matrix arrangement of daylight and tungsten LEDs.

Turning now to FIG. 1A, a schematic diagram of LEDs are shown positioned in a matrix arrangement on a circuit board for use in a LED lamp or bulb in an embodiment of the present invention. There is a support structure 10 configured to receive and retain a plurality of LEDs 12 in a uniform and consistent position. The support structure 10 is preferably an elongated and narrow surface shaped to insert into a tubular transparent or diffusor shade such that the lamp construction is compatible with existing fixtures for traditional fluorescent lamp tubes. The LEDs 12 are positioned in a uniform and consistent directional position, and positioned in a matrix arrangement such that each LED is located equidistantly apart from surrounding LEDs 12. The support structure may be or may include a printed circuit board configured to connect a power source to the LEDs.

The preferred embodiment includes a first group of LEDs 12a (marked with D, for daylight white), and a second group of LEDs 12b (marked with T, for tungsten light), located on a surface of support structure 10. The D LEDs are configured to produce a light with color temperature in the range of 5400 to 5600 K (or about 5400 to 5600K) for daylight white light. The T LEDs are configured to produce a light with color temperature in the range of 3050 to 3300 K (or about this range) and most preferably 3200K or about 3200K for warm white light. Additional ranges that may be acceptable are 2800K to 3300K and 5000K to 5600K, but the above are more preferred. About means within 3 percent.

These ranges have been tested and used in numerous productions, and have been determined to be the preferred desired color temperature ranges for shooting television and film productions utilizing daylight and tungsten lighting to recreate day time and dusk/night time scenes.

In the embodiment as shown in FIG. 1A, the D and T LEDs may be arranged in an alternating checkerboard pattern to provide an even distribution of light on the subject. This arrangement is preferred to create an even lighting cast even when only one grouping of LEDs is being used at any given time. In the preferred embodiment, the circuit board of the LED lamp 8 (FIG. 2) is configured such that only one group of LEDs 12 can be turned on at a time. The D LEDs 12a and the T LEDs 12b are exclusively operated to produce either the daylight white lighting with the D bulbs, or the warm white lighting with the T bulbs. Since only one group of bulbs can be on at a single time, the arrangement of the two groups of LEDs may have a direct impact on the quality of the light produced by the LED lamp. Therefore, it may be advantageous to arrange the D and T bulbs in a consistently inter-dispersed matrix configuration as shown in FIG. 1A to produce the highest quality, evenly cast lighting.

Figure 1B:
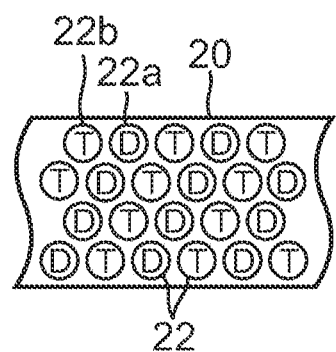
FIG. 1B is a schematic view of a bulb in accordance with another embodiment, showing a diagonally alternating arrangement of daylight and tungsten LEDs.
Figure 1C:
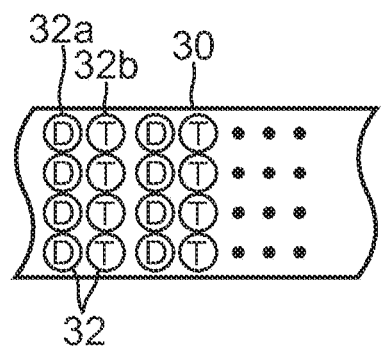
FIG. 1C is a schematic view of a bulb in accordance with an additional embodiment, showing an alternating arrangement of columns of daylight and tungsten LEDs.

In another embodiment, it may be desirable to create lighting effects with more directional light or harsher light wherein the LEDs of the D or T groups are not interdispersed, but positioned closer together within a single group. FIG. 1B shows an embodiment depicting LEDs 22 on support 20. D LEDs 22a and T LEDs 22b are in an alternate diagonally alternating arrangement of D and T LEDs, and FIG. 1C shows yet another embodiment depicting LEDs 32 on a support 30 having grouped alternating arrangement of columns of D and T LEDs 32a, 32b, respectively.

Figure 1D:
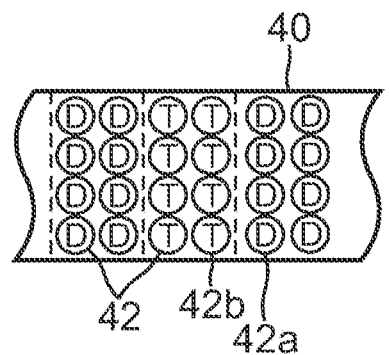
FIG. 1D is a schematic view of a bulb in accordance with a further embodiment, showing an alternating arrangement of groups of daylight and tungsten LEDs.

FIG. 1D shows a support 40 having LEDs 42 in alternating groups of columns of D LEDs 42a and T LEDs 42b. The LED arrangements are not limited to these embodiments and can vary based on the desired lighting effect for the particular use or scene being lit, but most preferably are individually alternating.

Figure 2:
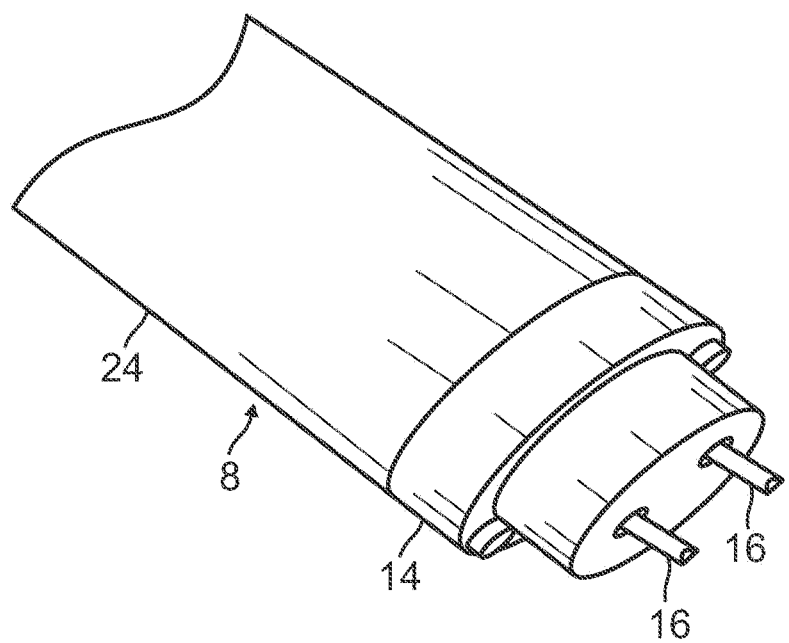
FIG. 2 is a perspective view of a portion of a bulb of the present invention.

FIG. 2 is a perspective view of a portion of LED lamp 8, which is similar to a traditional fluorescent lamp tube. Each end of the LED lamp 8 includes a base 14 which includes a housing and which has an end cap which includes electrical connectors 16. This embodiment is configured with dimensions equivalent to a "T8" size traditional fluorescent tube, which is one inch in diameter, or a T12 size (one and a half inch diameter). The end cap and connectors 16 are configured to be compatible with traditional fluorescent lighting fixtures and mounts such that the LED lamp 8 may be installed into existing lighting fixtures (such as shown in FIG. 4A). There may be another end cap at the other end of the lamp 8. That end cap need not have connectors (or may have dummy connectors) since the lamp 8 is preferably powered from one side, having onboard electronics including an LED driver and an inverter or power supply. (In other embodiments, where the lamp 8 receives a DC input, that DC input may include power and control signal(s), as in the USB connector formed in the end cap embodiment(s) herein.)

A clear or semi-translucent or translucent diffusor shade tube 24 is also visible which acts to diffuse the light produced by the LEDs of the LED lamp. In the preferred embodiment, tube 24 is configured and sized with the same diameter as a traditional fluorescent tube lamp, such as a size T8 or T12. There may be various embodiments with varying tube diameters configured with the same diameter and dimensions of various other traditional fluorescent lamp sizes. Therefore, preferably the housing except for the end caps is the same length and the same or similar curvature to the diffusor shade tube 24. The diffusor shade tube fits on top of the housing. The electronics are housed in and/or mounted on the housing. The housing may preferably be metal, especially aluminum, for its heat sink properties. Preferably the LED light has substantial power and thus needs to dissipate substantial heat. For example, the LED light may be powered with one or two 110V AC current sources and may use about fifty watts of power or at least forty watts. The end caps may be part of but preferably mount to the housing.

Figure 2A:
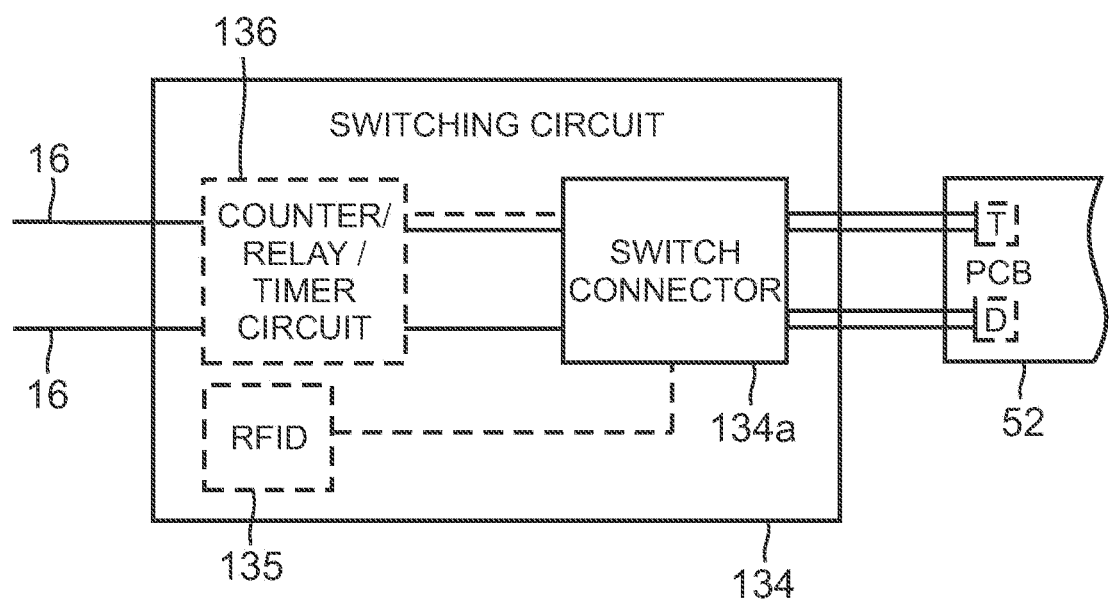
FIG. 2A is a schematic view of various alternative switching mechanisms in accordance with an embodiment of the present invention.

FIG. 2A is a schematic view of various alternative switching mechanisms in accordance with an embodiment of the present invention. Switching mechanism 134 shows various options for switch 34 (see FIG. 3) It may be a manual switch such as manual switch 34a (see FIG. 4) or it may be a remote controlled switch having an RFID (radio frequency identification detector) 135 or infrared (IR) to receive remote controls to cause actual switch connector 134a, which switch 34 either way will toggle (electronically switch) between allowing current to drive the T LEDs or the D LEDs on circuit board 52 (PCB). Signals could also travel along the electrical connectors 16 by means of modulating an initial portion of the electrical power carried to connectors 16 (from, e.g., a control unit as in FIGS. 5 and 6). The modulated signal could be a certain pulsing of power on and power off in an initial period of turning on the switch to send power to the lamp, e.g., two pulses, for switching to the T LEDs and e.g., four pulses, for switching to the D LEDs. The switches on the control unit could be three way switches, enabling selection between D LEDs on, T bulbs on, and no light, or two way switches enabling selection between D LEDs on and T LEDs on, and using a master power switch to switch off the lamp. The control unit in this case would include circuitry to provide the modulated power on signal. When a counter/relay/timer circuit receives the pulses, it signals the switch connector 134a to move to the appropriate position to power the T LEDs or D LEDs. Alternatively, the control unit may send separate control signals along a multipin connector, and the LED lamp switching circuit may be a microprocessor or the like for receiving the signals and performing the switching function. In such a case, a standard fluorescent receiver and the leads into the bulb may be modified to send and receive appropriate control signals in addition to current.

FIG. 3 is a schematic view of an LED lamp of FIG. 2 in more detail. Representations of the LED lamp 8, base 20, connectors 16, and connector wires 30 are shown. An AC (or DC) power source 33 such as an electrical grid, battery, or generator may be connected to the connector wires to provide power to the LED lamp 8. This embodiment may also include at least one LED driver 36 configured to provide appropriate power input to the various LEDs of the first and second types, respectively, depending on and in response to a switch 34. LED lamp 8 may include two LED drivers 36, a first driver to provide appropriate power input to the D LEDs, and a second driver to provide appropriate power input to the T LEDs.

In another preferred embodiment, the driver or drivers 36 are configured to provide dimmable control over the LEDs of the LED lamp. The LED lamp 8 may include the power input switch 34 configured to selectively provide power to either the grouping of D LEDs or the grouping of T LEDs. Preferably, the grouping of LEDs to be powered at a given time by the power source may be selected by the user. Also preferably, each lamp or bulb 8 may have arrayed LEDs on each side of support 10 (or 20, 30 or 40).

In an alternate embodiment as shown in FIG. 4, the LED lamp may include two sets of connectors 16, one set on each end of the LED lamp. One set of connectors may be electrically connected to provide power to one grouping of LED bulbs, and another to provide power to the other grouping. Each connector may be powered by distinct power sources. In another configuration, a power input switch 34a external to the LED lamp may be controllable by the user to selectively provide power to the desired grouping of LEDs. In an embodiment, the LED lighting system may include a wiring connector having at least sixteen pins, two of the pins being connected to the support structure to supply power to the first grouping of LEDs and the second grouping of LEDs. In the preferred embodiment, the LEDs are electrically connected to a power source by a printed circuit board (PCB) 52.

As shown in FIG. 4A, there is a fluorescent bulb receptacle 55 in which bulb 8 may be placed to connect to a power source in the same manner as a fluorescent bulb would be placed therein.

In FIG. 4, there is an LED lamp 50 in an embodiment of the present invention. The lamp has multiple, e.g., four, LED lamps 57, 59, 61 and 63, each having LEDs in a matrix arrangement. LEDs 52 are positioned on a printed circuit board 54 (PCB) in a matrix arrangement. Two types of LEDs are utilized: there is a first group of LEDs configured to provide light with a color temperature between a predetermined range of 3050 and 3300 K, and a second group of LEDs configured to provide light between a predetermined range of 5400 to 5600 K. The two groups of LEDs are preferably arranged in an alternating matrix arrangement across the PCB as in FIG. 1A or may also be as in FIG. 1B, 1C or 1D. In an embodiment, the PCB is connected to sets of connectors on both ends of the PCB. In another embodiment, only one set of connectors is provided on one end of the PCB.

Each LED lamp 50 includes a clear, translucent or semi-translucent diffuser shade tube 24 configured to sleeve over the PCB and the LEDs. Preferably, the diffusor shade tube 24 is configured with the same size and dimensions as traditional fluorescent tube lamps, such as the T8 size (one inch diameter or if T12 then one and half inch diameter, etc.). The diffusor shade tube 24 may be constructed from glass or durable plastic with a white or neutral gray coloring so as to not affect the predetermined color temperature of the LED bulbs.

Figure 5:
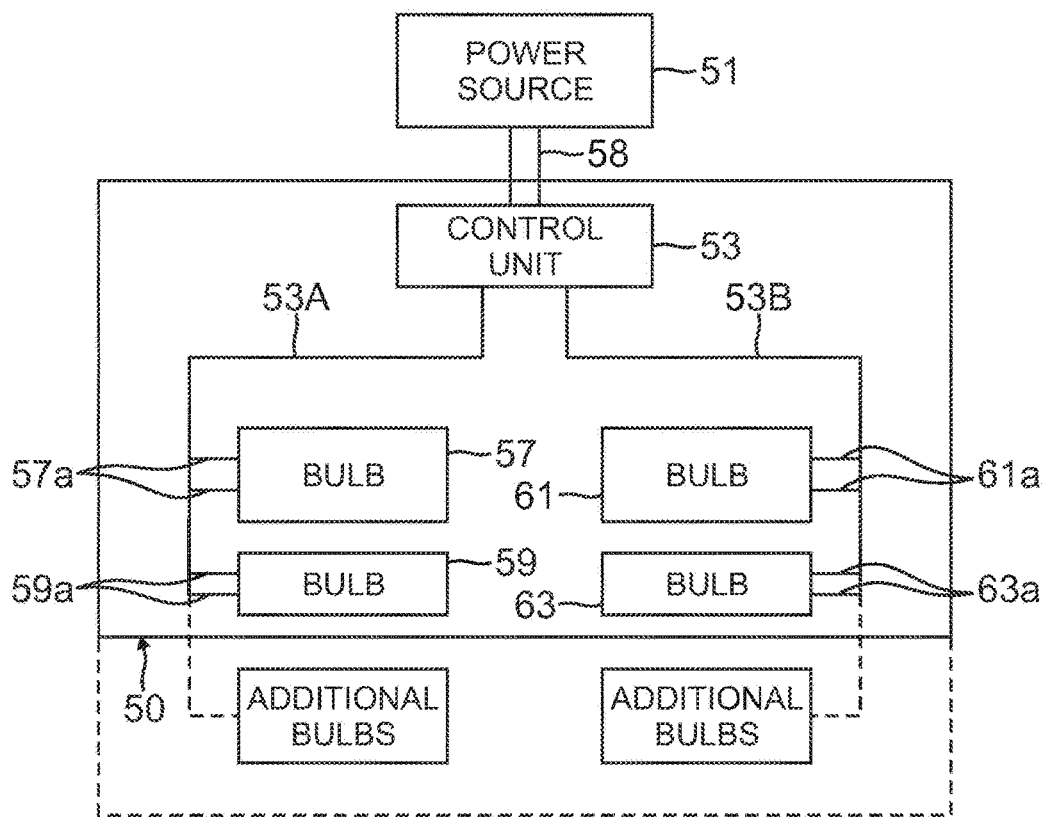
FIG. 5 is a schematic view of an LED lamp system in an embodiment of the present invention.

In FIG. 5, there is an LED lamp system 50 of the present invention. There is a power source 51 such as 110V AC current at 50 or 60 Hz. The power source is connected to control unit 53. From control unit 53, one or multiple cords or connectors 53A, 53B such as 16 pin connectors electrically connect the power source with the LED lamps 57, 59, 61, 63, such as if FIG. 3 or 4 with LED patterns such as in FIG. 1A or FIG. 1B, 1C or 1D. Specifically, the electrical wires in the connectors connect to leads 57a, 59a, 61a and 63a, respectively. Additional lamps may be connected as well, e.g. four per sixteen pin connector.

The drivers for each bulb could be connected to separate leads for each type of LED (D or T). More preferably, so that a fluorescent bulb receiver (e.g. receiver 55 of FIG. 4A) need not be modified, the driver may include circuitry (e.g. a relay or series of relays or a counter or other controller) to toggle between the D LEDs and the T LEDs when the power is on. A simpler way (to selectively toggle) is to have a switch, manual or remote control such as switch 34 of FIG. 3 or 34a of FIG. 4 that toggles between powering the D bulbs and the T bulbs. Lamp system 50 may be configured to be compatible or similar to traditional fluorescent tube lamp fixtures. Control unit 53 is controllable by the user to selectively provide power from power source 51 to a desired grouping of LED lamps or bulbs (57, 59 or 61, 63). In these embodiments, a manual switch (such as 34 or 34a or remote control or driver control) may be mounted on the support structure configured to enable selective operation of either the first type LEDs (D) or the second type LEDs (T).

Figure 6:
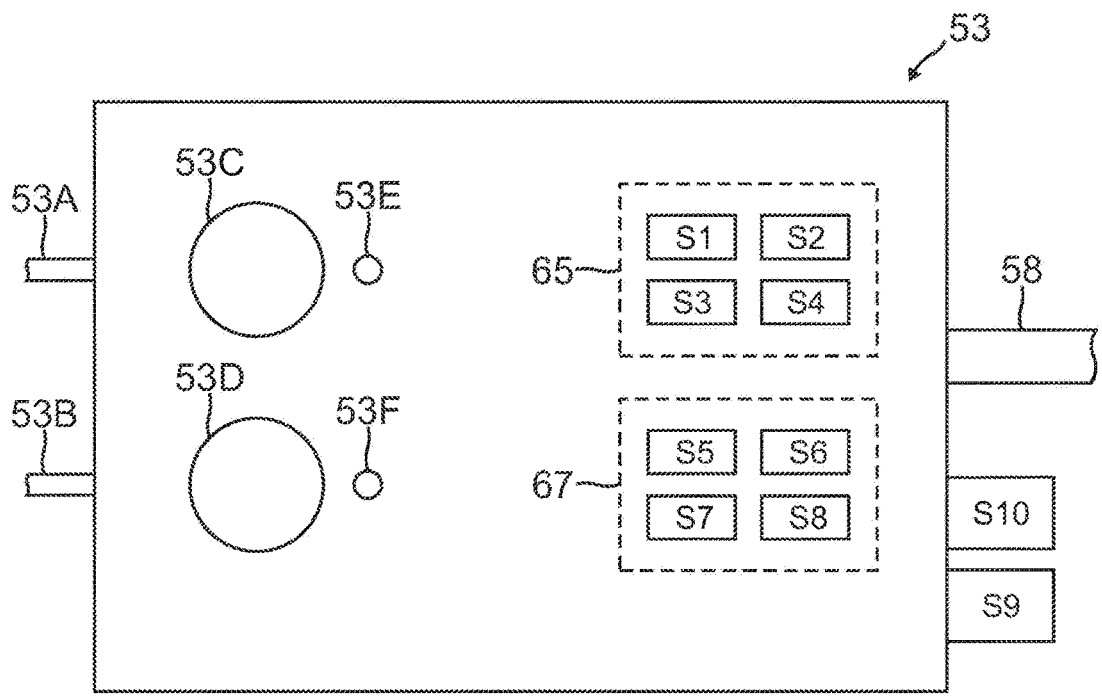
FIG. 6 is a perspective view of a control box of an embodiment of the present invention.

FIG. 6 is a schematic view of control unit 53 of the present invention. The control unit 53 may include toggle switches S1 to S8 for controlling power input to the LED lamps 57, 59, 61, 63 and any additional bulbs (e.g., two more per each cable 53A, 53B) connected to the control unit. The control unit may be configured and connected such that each switch may control one or a predetermined grouping of LEDs for one specific LED lamp of the present invention, toggling between an "On" and "Off" position for that particular grouping of LED bulbs. Alternatively, each switch may control a plurality of the same LEDs grouping across a plurality of LED lamps in a bank of lights. For example, switch S1 may control the On/Off toggle of D color temperature LEDs for a bank of lights comprising two, four or more LED lamps, and switch S2 may control the On/Off toggle of T color temperature LEDs for the same two, or four or more LED lamps.

In another preferred embodiment, each switch (e.g. S1) may be configured to simply control the power switch of the LED lamp to selectively provide power to the D or T grouping of LEDs of the LED lamps. In this configuration, the user is unable to toggle between an On/Off power configuration to a particular LED lamp, but instead is able to simply control the specific grouping of LEDs being powered at any particular point in time. Additionally, control unit 53 may include dimming switches 53C, 53D or knobs to control the power gain levels to the LED lamps to vary the brightness or LEDs and control lumens from the LED lamp. A power-on LED indicator 53E and 53F may be included for each bank of switches 65, 67, respectively. There may also be a master power switch S10 and another master power switch S9 for each switch bank 65, 67, respectively.

The control unit may be connected to the LED lamps via a standard quick connect interface. The quick connect interface may be connected to the LED lamps via industrial cables widely used in the lighting and commercial production industry.

Spectrophotocolorimeter testing for an LED lamp of the present invention, maps color perception in terms of two parameters, x and y. The chromaticity coordinates map the color with respect to hue and saturation on the two-dimensional Commission Internationale de l'Eclairage (CIE) diagram. The testing of Daylight indicates a light color temperature of 5000 K. The color rendering index (CRI) is indicated as Ra which has been found to be at least about 92 to 93 percent.

A CIE test of tungsten had a light color temperature of about 2800K to about 3000 K. The color rendering index is indicated as Ra being at least about 93 percent. Flux has been found to be about or over 1000 lumens.

Light systems of the present invention are suitable for TV or studio production.

Figure 7:
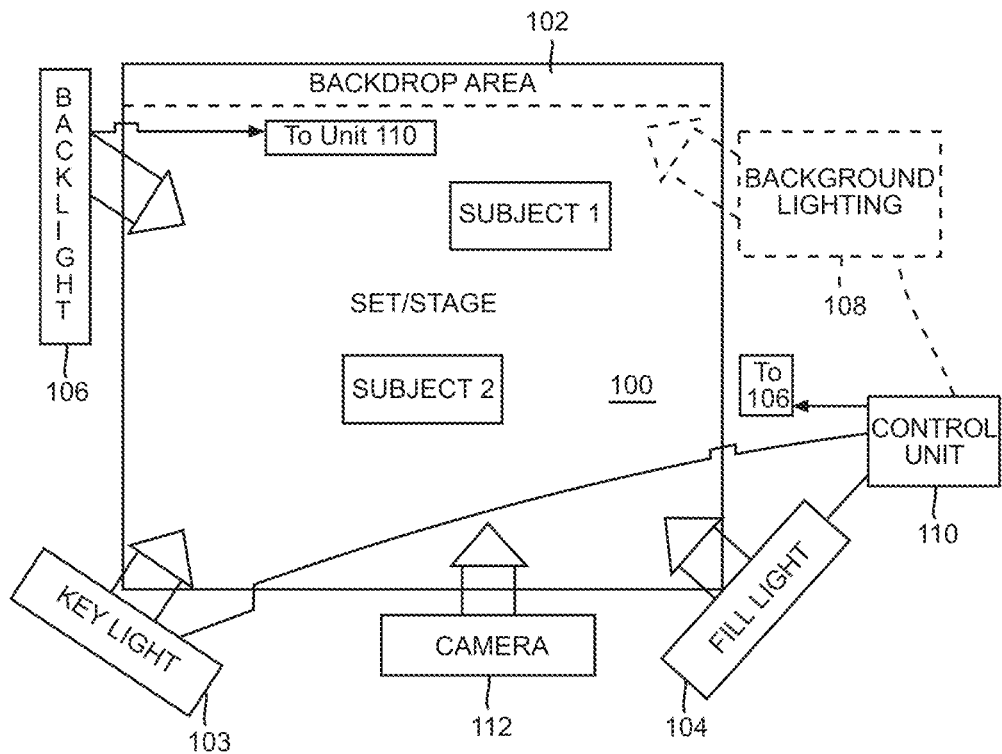
FIG. 7 is a schematic view of a stage and various LED lamps used for lighting a set in an embodiment of the present invention.

FIG. 7 is a diagram of the system of the present invention being used for a commercial production. The diagram depicts a scene being shot for commercial uses inside of a large studio or production warehouse. There is a set or stage 100, subjects 1 and 2 on stage (people), and a backdrop are 102. A plurality of LED fixtures 103, 104, 106 and 108 are provided and mounted to direct desired lighting on the stage or set of the production. Each LED fixture 90 may include a plurality of LED lamps, as in prior embodiments, e.g., a bank of four T8 or T12 size bulbs or other desirable size. Each group is configured to provide lighting within a predetermined color temperature range. In the diagram, the lighting provided by the LED lamps are selectively daylight white, with a color temperature between the range of 5400 to 5600 K, and tungsten or warm white with a color temperature range of 3000 to 3300K, using control unit (or units) 110, which may be the same as shown in FIGS. 5 and 6. Other temperature ranges as disclosed herein may be used.

Each of the LED lamps is connected to control unit 110 via cables. The cables may be standard cables and wiring widely used in the lighting and commercial production industry. The cables may range from 50 to 100 feet in length, and may be extended to lengths of up to 200 feet, depending on production requirements. In many cases, the standard cables and wiring may be preexisting cables previously used with traditional fluorescent or halogen studio lighting. The compatibility of the LED lamps and fixtures of the present invention allow for use with traditional infrastructure and cables already in place. The cables may be connected to the control unit via a quick connect interface, which may include a secure screw-in connection. The quick connect interface may also be a standard connection interface widely used in the industry with traditional lighting equipment, which may be reused with the current invention. The control unit is connected via a quick connect interface to a power source, such as a power grid, generator, or large capacity battery, as in prior embodiments.

In the diagram, subjects S1 and S2 are being filmed on a film camera 112 during a scene. To recreate daylight lighting, control unit 110 is used to turn on power to only the daylight white LED bulbs of the LED lamps, which produces daylight white light with color temperature in the predetermined range of 5400 to 5600 K. The light is directed to hit the subject(s) and bounce off to give a predetermined color temperature based on the subjects' skin tone, which is then captured by the camera 112, giving the desired appearance and effect on film.

EXAMPLES

Example 1

A four foot long T12 (1.5" diameter) LED lamp was constructed with four rows of alternating LEDs of a daylight type and tungsten (warm light) type, using the pattern of FIG. 1A. The power consumption is quite low for the light output.

| | |
|---|---|
| Color Temperature (Daylight Mode) | 5500K ± 100° K |
| Color Temperature (Tungsten Mode) | 3200K ± 150° K |
| CRI (color rendering index) | 90% + |
| Photo Color Correction (CC) Green | <5G |
| Photo Color Correction (CC) Magenta | <5M |

| | |
|---|---|
| Luminosity Daylight avg Lux/FC | 3 ft: 549/51 |
| | 5 ft: 289/27 |
| | 10 ft: 80/7.4 |
| | 15 ft: 40/3.7 |
| Luminosity Tungsten avg Lux/FC | 3 ft: 530/49 |
| | 5 ft: 230/21 |
| | 10 ft: 66/6 |
| Power Consumption (@120 V/60 Hz) | 15 ft: 30/2.8 |
| | 0.35 amp 42 watts |

Fluorescent lights range from a CRI (color rendering index) of about 50% for the basic types, up to about 90% for the best tri-phosphor type. The present invention can achieve a CRI as high as or higher than expensive fluorescent lights.

Spacing of the LEDs may, e.g., be one quarter inch apart or about one quarter inch apart from the middle of one LED to the middle of the next one. It can be less and can be more as desired. For example, in a T12 bulb that is four feet long (1198 mm without the leads and 1213 mm with leads; by diameter of 41 mm), there would be four LEDs over the width and 144 LEDs long for a total of 576 LEDs. Some of the four foot length of the bulb is taken up by the leads and end caps, driver and switch. The LEDs are preferably SMD 3528 (and/or SMD 2835 may be used or other suitable size) single color LEDs. Such LEDs may be about 3.5 mm by 2.8 mm, or very roughly about a ⅛ inch square.

Example 2

A four foot long T12 (1.5" diameter) LED lamp was constructed with four rows of alternating LEDs of a daylight type and tungsten (warm light) type, using the pattern of FIG. 1A. The power consumption is quite low for the light output. Other parameters are the same or substantially the same as in Example 1.

| | |
|---|---|
| Color Temperature (Day white Mode) | 5000 to 5500K |
| Color Temperature (Warm white Mode) | 2700-3200K |
| CRI (color rendering index) | >91 |
| Photo Color Correction (CC) Green | <5G |
| Photo Color Correction (CC) Magenta | <5M |
| Luminosity Daylight (day white) avg | 1170 ± 10% |
| Luminosity Tungsten (warm white) avg | 1010 ± 10% |
| Power Consumption (@110 V) | 20 watts each color |
| Type | Dimmable |
| Control | Selectable between warm white and day white |

At one foot the output can be over 1000 lumens, and therefore the light is suitable for stage uses. Therefore, with the same number of light bulbs as high quality fluorescent light to light a stage or set, which bulbs must be changed out for different scenes when different colors are required, use of the bulbs in accordance with the present invention achieves suitable light for the stage or set without having to change any bulbs, whether a scene is to be shot at warm white light or at daylight white.

Therefore, a method of a preferred embodiment of the invention, would be to light a stage or set to be filmed or photographed with a set of bulbs in accordance with the invention, and continue to light the stage or set with the same set of bulbs, selectively switching the bulbs between warm white light and daylight white for different scenes and/or different parts of scenes.

Example 3

A four foot long T12 (1.5" diameter) LED lamp was constructed with four rows of alternating LEDs of a daylight type and tungsten (warm light) type, using the pattern of FIG. 1A. The power consumption is quite low for the light output. Other parameters are the same or substantially the same as in Example 1.

| | |
|---|---|
| Color Temperature (Day white Mode) | 5000 to 5500K |
| Color Temperature (Warm white Mode) | 2800 to 3200K |
| CRI (color rendering index) | >92 |
| Photo Color Correction (CC) Green | <5G |
| Photo Color Correction (CC) Magenta | <5M |
| Luminosity Daylight (day white) avg | 1200 lumens ± 10% |
| Luminosity Tungsten (warm white) avg | 1050 lumens ± 10% |
| Power Consumption (@110 V) | 20 watts each color |
| Type | Dimmable |
| Control | Selectable between warm white and day white |

Again, luminosity is at least 1000 lumens. Lifespan in Examples 1, 2 and 3 is estimated at 40,000 hours. The tubular light may have a diameter, for example, of 41 mm.

To create the LED lamps, in each of the above examples, LEDs in the desired color ranges are selected which provide at least about 1000 lumens. The LEDs are tested to provide the desired light, e.g., with CRI of at least about 90 percent or more, flux of at least about 1000 lumens or more, and purity of color. Preferably, purity of light includes no more than about three percent green, no more than about three percent yellow and no more than about three percent magenta tones. In addition, in more preferred embodiments, the LEDs for the T (warm white light) type are selected in the ranges of 2800 to 3300K or about 2800 to 3300K, and more preferably 3050 to 3300K or about 3050 to 3300K, and the D (daylight white light) type are selected to be 5000 to 5800K or about 5000 to 5800K, and more preferably 5000 to 5500K or about 5000 to 5500K and most preferably 5200 to 5400K or about 5200 to 5400K. Alternatively, they may be selected in other ranges disclosed herein.

Figure 8:
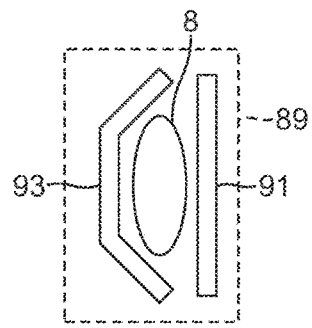
FIG. 8 is a schematic view of an LED lamp with a reflector and a light diffuser in accordance with an embodiment of the present invention.

FIG. 8 is a schematic view of an LED lamp 89 which may be used in the embodiment of FIG. 7. The lamp has a reflector 93 and a light diffuser 91 or gel in accordance with an embodiment of the present invention.

Multicolor Embodiment(s)

In another embodiment, instead of providing light from just two LEDs of different color designations as described above, the LED light may be configured with a variety of LEDs to provide a lighting output that is adjustable over a wide visible spectral range. The term "lighting output" is meant to include the scope of lighting effects that a user would be able to achieve from the LED light, given the description herein. A capability to produce a complete range of lighting output may reduce or eliminate the need to use "gels" to provide desired lighting output, thus reducing or eliminating the time required to reconfigure a light for use. A widely varying photometric (visible light spectrum) light output may be provided by utilizing different individual LEDs and varying the output intensity from them, individually to achieve a desired light output. While the light output is primarily describable as an emitted light color resulting from the LED intensity combination selected, it is considered for purposes of studio and commercial lighting that the mixing of light from the plurality of LEDs would be understood from the point of view of its effect for a photographic or video recording or stage effect by a lighting technician. More specifically, lighting technicians may wish to be able to select light at various color temperatures from a wide range, i.e., a wide spectral range. Typical color temperatures may vary from 1700 K, i.e., the color temperature of a match flame, to 15000K, the color temperature of a clear blue sky. Light fixtures capable of providing light output at varying color temperatures allow light technicians to quickly configure lighted scenes with light that can simulate various environments.

Figure 9A:
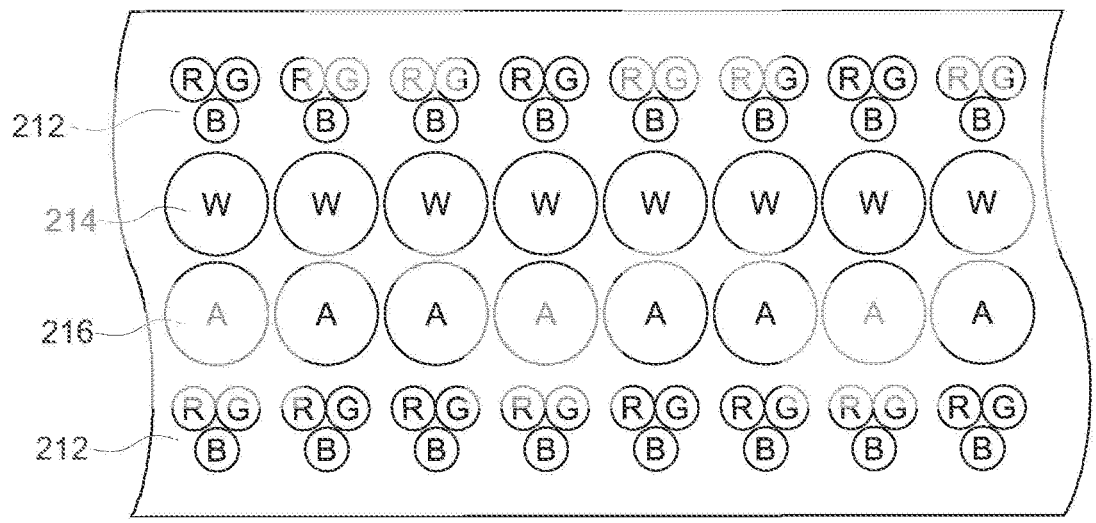
FIG. 9A is a schematic view of a LED light in accordance with one embodiment, showing a matrix arrangement of RGB, white, and amber LEDs.
Figure 9B:
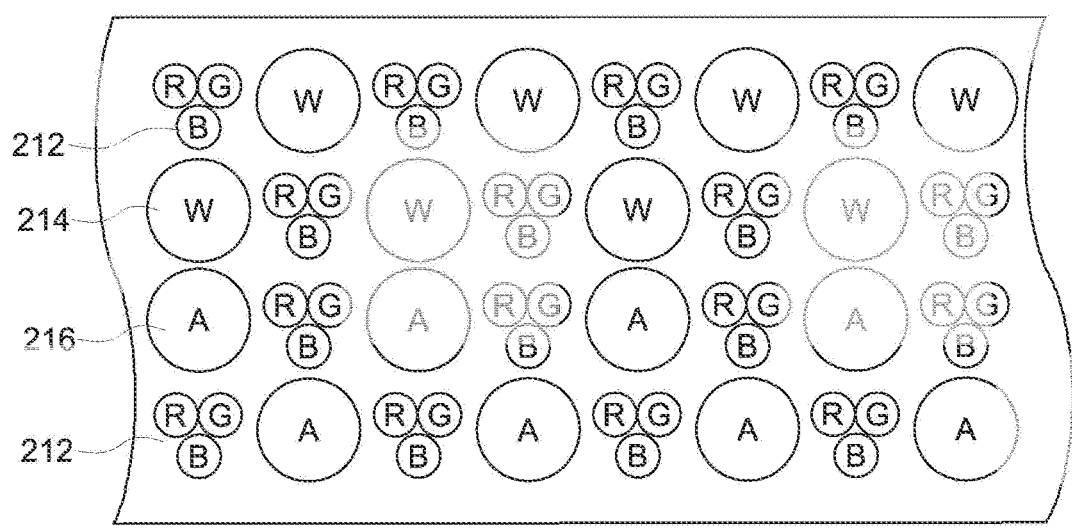
FIG. 9B is a schematic view of a bulb in accordance with another embodiment, showing a alternating arrangement of RGB, white, and amber LEDs.

An LED light configuration for generating light output in a wide spectral range may be accomplished with four or more LEDs in the array of LEDs. FIG. 9A shows a most preferred configuration of an LED array (also called a matrix) having a first row of RGB LEDs 212, a second row of white LEDs 214, a third row of amber LEDs 216 and a fourth row of RGB LEDs 212. The RGB LEDs are made of LED chips (also called dies) each capable of separate intensity output for each of the R, meaning red, G, meaning green and B meaning blue chips. These can be adjusted separately by control signals or as a group. Selection of the light output of the LED light is accomplished by controlling the output intensity of the LED and in the case of the RGB LEDs, controlling the output of each of the three R, G and B LED chips or LEDs. Control of the LEDs is described in additional detail below. The LEDs in FIG. 9A (and also as shown in FIGS. 9B and 9C) are in vertical columns (i.e., up and down the page).

The LED light configuration is not limited to using LEDs of the same color in the individual rows of the LED array (i.e., across the page). FIG. 9B shows the RGB LED 212 and the white LEDs 214 being alternated in the first and second row of the LED array. Similarly, the RGB LED 212 and the amber LEDs 216 are alternated in the third and fourth row of the LED array. This configuration may provide for better color mixing across the entire length of the LED light as in the exemplary fluorescent tube light form in one implementation of the invention, although wiring may be more complex than for the matrix of FIG. 9A.

Figure 9C:
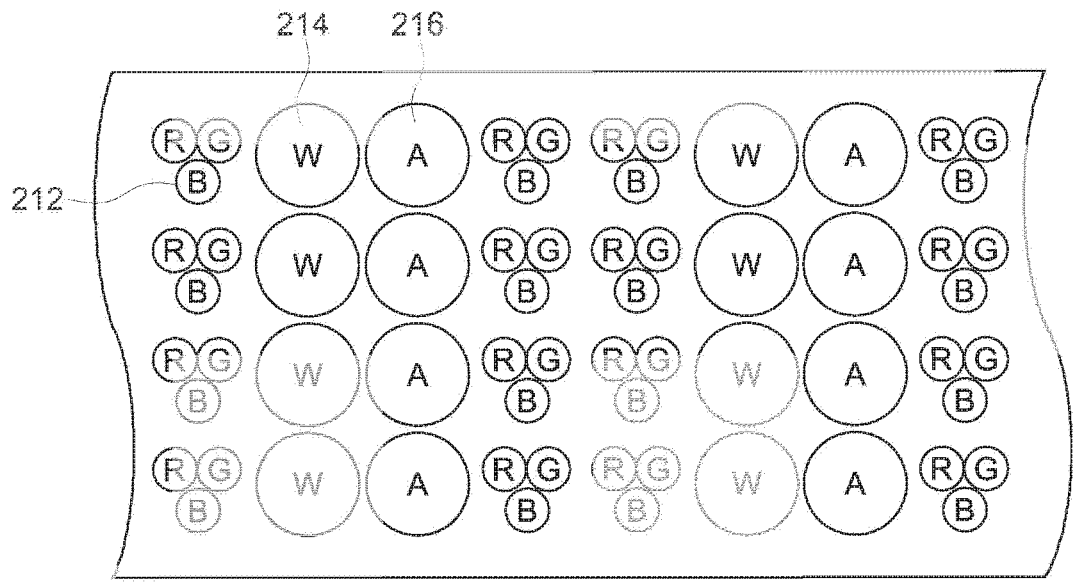
FIG. 9C is a schematic view of a LED light in accordance with an additional embodiment, showing an alternating arrangement of columns of RGB, white, and amber LEDs.

FIG. 9C shows the RGB LED 212, the white LEDS 214, and the amber LEDs 216 grouped by columns rather than rows. That is, as shown in FIG. 9C, a first column has RGB LED, a second column has white LEDs 214, a third column has amber LEDs 216, and a fourth column has RGB LED 212. This pattern then repeats throughout the array of LEDs. This configuration may also provide for better color mixing across the entire length of the LED light and may also lower the cost and complexity of controlling the LEDs and fabricating the LED light.

Figure 9D:
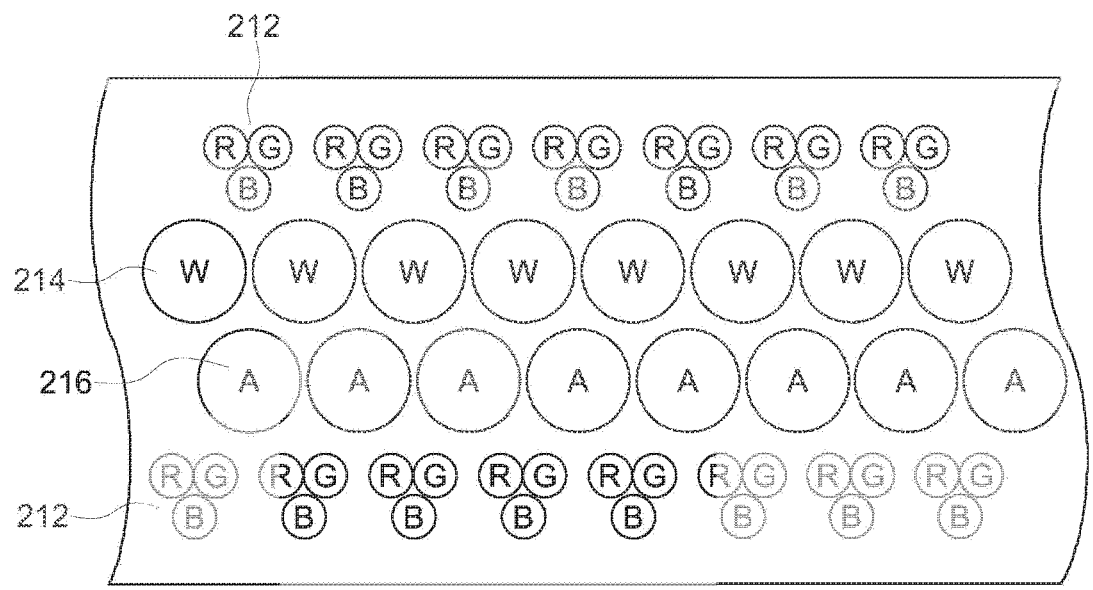
FIG. 9D is a schematic view of a LED light in accordance with a further embodiment, showing an offset arrangement of groups of RGB, white, and amber LEDs.

FIG. 9D shows that the rows of individual LEDs may be offset from adjacent rows (defining diagonal columns). As shown in FIG. 9D, each LED 214 in the second row of white LEDs 214 is offset from each LED 212 in the first row of RGB LEDs 212. The third and fourth rows are similarly offset. The offsetting can be described as providing a diagonal columned order within the matrix.

Figure 9E:
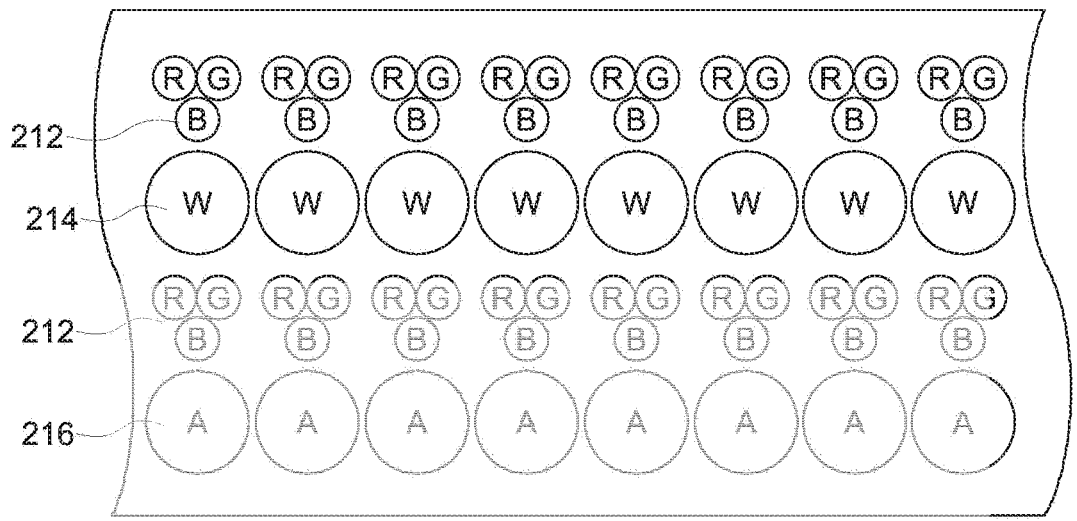
FIG. 9E is a schematic view of a LED light in accordance with an additional embodiment, showing an alternate arrangement of RGB, white, and amber LEDs.
Figure 9F:
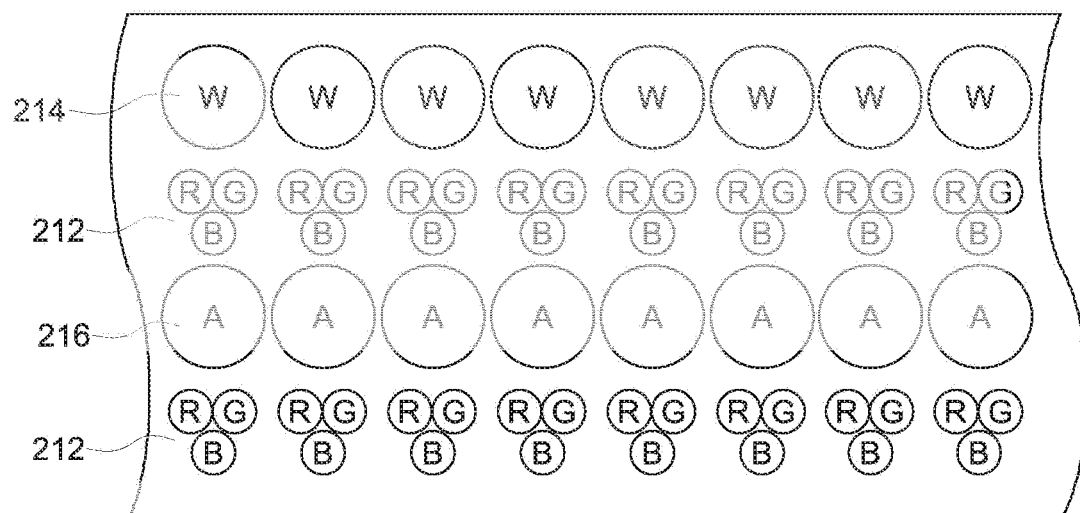
FIG. 9F is a schematic view of a LED light in accordance with an additional embodiment, showing another arrangement of RGB, white, and amber LEDs.
Figure 9G:
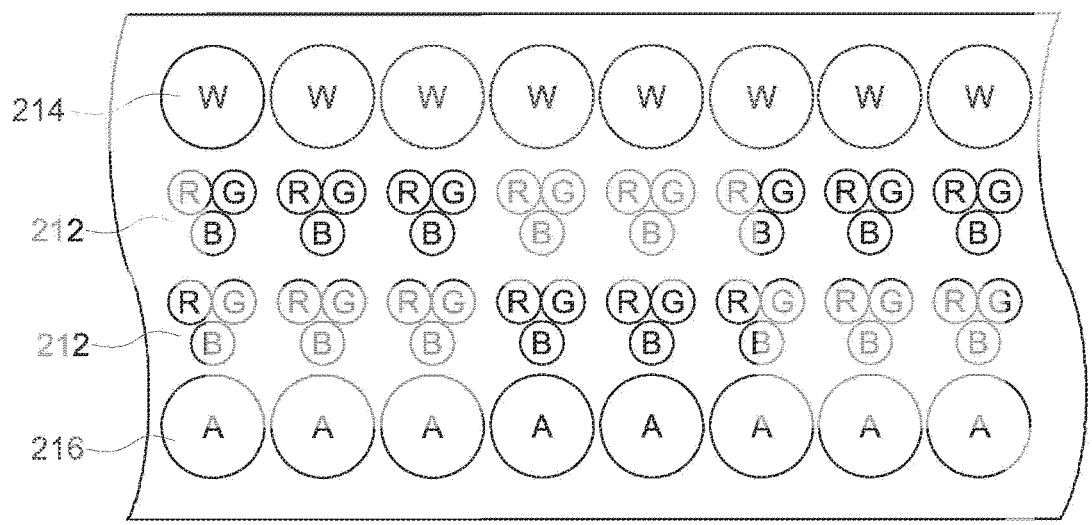
FIG. 9G is a schematic view of a LED light in accordance with an additional embodiment, showing another arrangement of RGB, white, and amber LEDs.
Figure 9H:
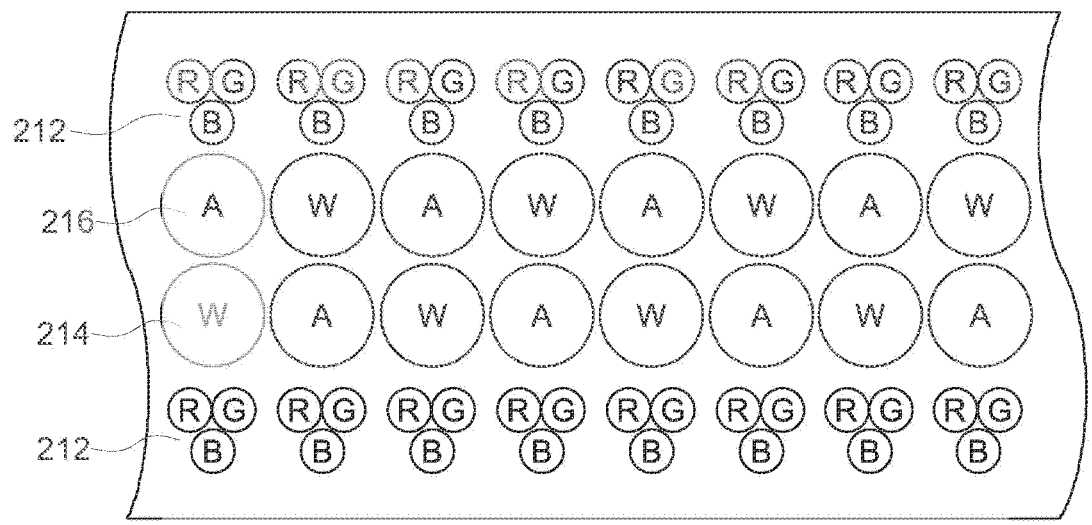
FIG. 9H is a schematic view of a LED light in accordance with an additional embodiment, showing another arrangement of RGB, white, and amber LEDs.

Other embodiments of the LED light are not limited to the row and column configurations depicted in FIGS. 9A-9D. Other physical configurations, layouts, and distributions of the LEDs may also be used. For example, FIG. 9E shows the first and third row having RGB LEDs 212 while the second row is white LEDs 214 and the fourth row is amber LEDs 216. FIG. 9F shows the second and fourth row having RGB LEDs 212, the first row having white LEDs 214 and the third row having amber LEDs 216. FIG. 9G shows the second and third row having RGB LEDs 212, the first row having white LEDs 214 and the fourth row having amber LEDs 216. FIG. 9H shows the outer rows having RGB LEDs 212 while the inner rows have an alternating pattern of amber LEDs 216 and white LEDS 214. Also, as shown in FIG. 9D in which the rows alternate offset of the columned order of FIG. 9A, each of the other columned orders of FIGS. 9B, 9C, 9E, 9F, 9G and 9H could be similarly offset and in each case define a diagonal columned order.

FIGS. 9A-9H are presented as exemplary LED layouts of the present invention, while other configurations, layouts, and distributions not shown may achieve the same effects or substantially the same effects and may be used in accordance with the present invention, FIG. 9A is most preferred and believed to have the best effects. In particular, for the set of four LEDs described above, they can be seen as allowing an ordered distribution in a four-by-four matrix in which all variations can be achieved and in which in every case an RGB LED is adjacent to either a white LED or an amber LED. This is seen in the four rows in which selected orientation of the LEDs allows each RGB LED to be adjacent to one of the white LED or the amber LED and the other RGB LED to be adjacent to the other of the white LED or the amber LED.

Figure 10A:
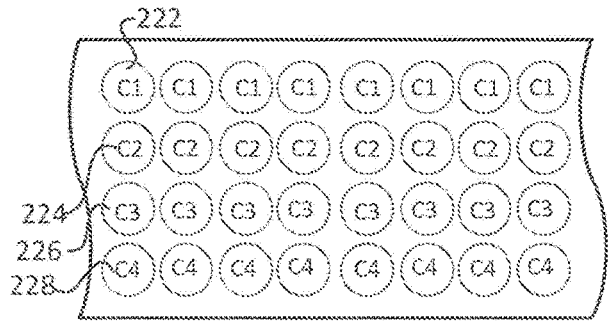
FIG. 10A is a schematic view of a LED light in accordance with one embodiment, showing a matrix arrangement of LEDs having different colors.
Figure 10B:
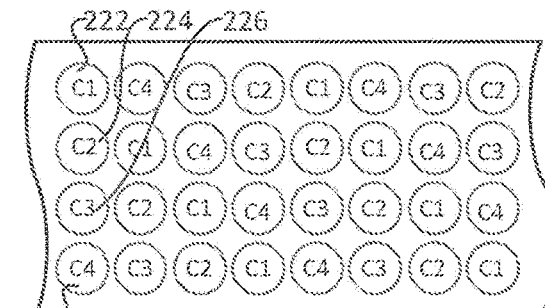
FIG. 10B is a schematic view of a bulb in accordance with another embodiment, showing a alternating arrangement of LEDs having different colors.
Figure 10C:
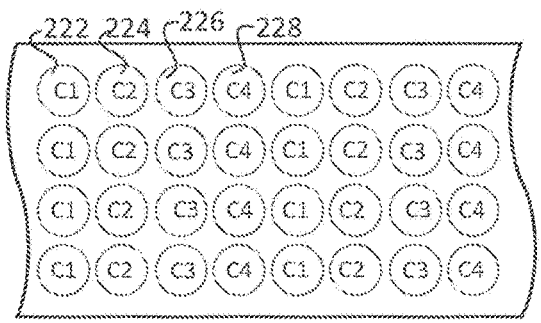
FIG. 10C is a schematic view of a LED light in accordance with an additional embodiment, showing an alternating arrangement of columns of LEDs having different colors.
Figure 10D:
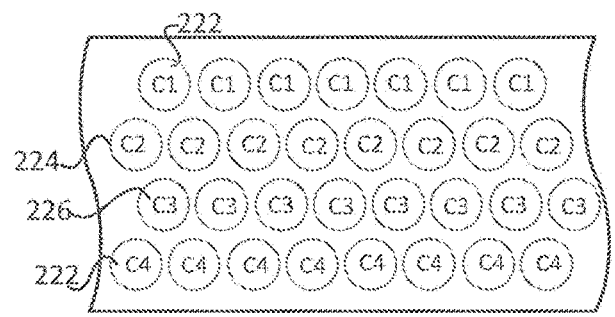
FIG. 10D is a schematic view of a LED light in accordance with a further embodiment, showing an offset arrangement of groups of LEDs having different colors.

Embodiments of the LED light providing a wide spectral range, though significantly less preferred, are not limited to the combination of RGB LEDs, amber LEDs and white LEDs depicted in FIGS. 9A-9H. FIGS. 10A-10D show various arrangements of LEDs having selected colors. These are arranged in vertical columns (FIGS. 10A, 10B and 10C) or in diagonal columns (FIG. 10I)). As shown in FIG. 10A, the LED light may have a first row of LEDs 222 having color C1, a second row of LEDs 224 having color C2, a third row of LEDs 226 having color C3, and a fourth row of LEDs 228 having color C4. The colors C1, C2, C3, and C4 may be a single color or may be a selectable or configurable color. The colors C1, C2, C3, and C4 may also represent fewer than four individual colors, e.g., color C1 may be the same as color C4. FIGS. 10B-10D show that the LEDs may be distributed in various configurations.

In the column and row configurations of FIGS. 9A-9H it can be seen that in each case the order or layout has each of the two RGB LEDs always adjacent either a white LED or an amber LED. This arrangement enables, particularly that of FIG. 9A, the light colors to mix so as to achieve the following:

The emitted light from the lighting tube appears uniform in color to the naked eye, which uniform appearance is due to the packing of the LEDs on a strip with a diffuser cover, as explained below with reference to the LED Strip Light. "Uniform in color" is thus defined herein as uniform in color to the naked eye. Yet, the LED controller operates to provide sufficient colors having sufficient light output (e.g., daylight of 5500 K across the whole lighting tube, and tungsten 3200 K across the whole lighting tube, as well as sufficient intensity for the colors of the color wheel, 255 or about 255 color hues) to be useful in a T12 form factor, four foot lighting tube that the entertainment industry may use it for lighting live or recorded shows.

As noted elsewhere herein, standard RGB lighting strips do not achieve a sufficient color spectrum for a color wheel usage. The use of the amber LED enables providing sufficient yellows and oranges to reach 255 color hues.

The use of the white LED, which appears to be redundant, helps boost the intensity of the light output to make the light sufficient for the entertainment industry usage.

Gels and filters are normally used to provide color lights in the entertainment lighting industry. DMX 512 controls are used to control the wheels (colored filters) to get 255 different color hues One such color system is the SeaChanger Color Engine. Other systems use color scrollers. In an embodiment the layout of the RGB LED and the white and amber LEDs is applied preferably for a tubular light form format, that is for the florescent light form format as discussed above. However the basic embodiment is for combining those LEDs in any light configuration so as to provide the advantageous full spectral range. In this respect, in one or more embodiments, the invention resides in achievement of the color wheel of 255 colors (for 8 bit DMX signals). The light/colors are also preferably dimmable. Thus, a color scrolling wheel or the like may be used to control the lighting tube output. DMX512 (or currently DMX-512A) standard is maintained by ESTA (Entertainment Services and Technology Association), now Plasa. This standard is for digital communications networks used to control stage lighting (entertainment industry lighting) i.e., controllers such as lighting consoles and dimmers.

Embodiments of the multicolor LED light are not limited to LEDs having up to four different colors (R, G, B, A and W). Other configurations of the multicolor LED light may have LEDs having more than three or four different color type chips and/or LEDs, but those skilled in the art recognize that such configurations may have increased fabrication costs or may require more complex control hardware and or software. It is preferred that the LED light providing the wide spectral range be provided in the fluorescent tube form factor described above and shown, for example in FIGS. 2 and 8. This form factor may also limit the selection of the number of colors for the LEDs or LED components.

Figure 11A:
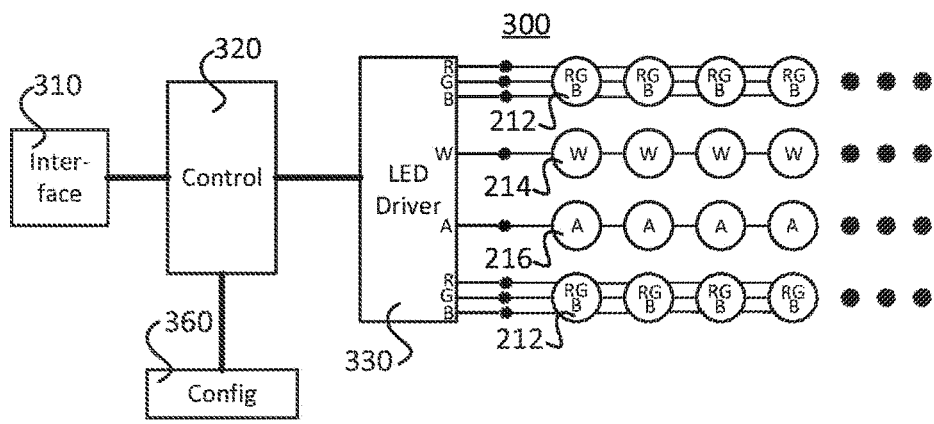
FIG. 11A shows a block diagram of an LED light configured for providing a wide spectral range.

FIG. 11A shows a block diagram of an LED light 300 configured for providing a wide spectral range. In FIG. 11, an interface 310 (such as a GUI having input devices such as a color wheel/scroll control and/or DMX 0 to 255 slide controller(s) for each DMX universe, e.g., four, six or eight lighting tubes per universe or other desired amounts) receives instructions for controlling the LED light. As described in additional detail below, this interface 310 may be a wired interface or a wireless interface. The interface 310 sends the instructions to a controller 320 that controls the light output from the LED light 300 based upon the received instructions. The controller 320 (preferably on board the LED light 300 but which may be external) will decode the instructions and provide controls to an LED driver 330 that energizes the LEDs 212, 214, 216.

As shown in FIG. 11A, the LEDs 212, 214, 216 may be wired together in a row configuration, such that the LED driver will provide the same control for all the LEDs 212, 214, 216 in that row. For example, FIG. 11A shows that the white LEDs 214 may be all wired together and the amber LEDs 216 may all be wired together, such that the LED Driver 330 provides the same control to all LEDs in that row. FIG. 11A also shows that the RGB LEDs 212 may receive separate controls for the red light, the green light, and the blue light in the RGB LEDs 212. The LED Driver 330 may then provide the same red light control to the red portions of all of the RGB LEDs 212. Similarly, the LED Driver 330 may then provide the same green light control to the green portions of all of the RGB LEDs 212. Finally, the LED Driver 330 may then provide the same green light control to the green portions of all of the RGB LEDs 212. The LEDs may be wired together in other groupings, such as the column-oriented grouping shown in FIGS. 9C and 9D. One may provide the same control for multiple LEDs or may provide for lower fabrication and component costs for the LED light. A configuration interface 360 provides for configuring the LED for specific applications or interfaces. The configuration interface 360 is described in additional detail below.

Figure 11B:
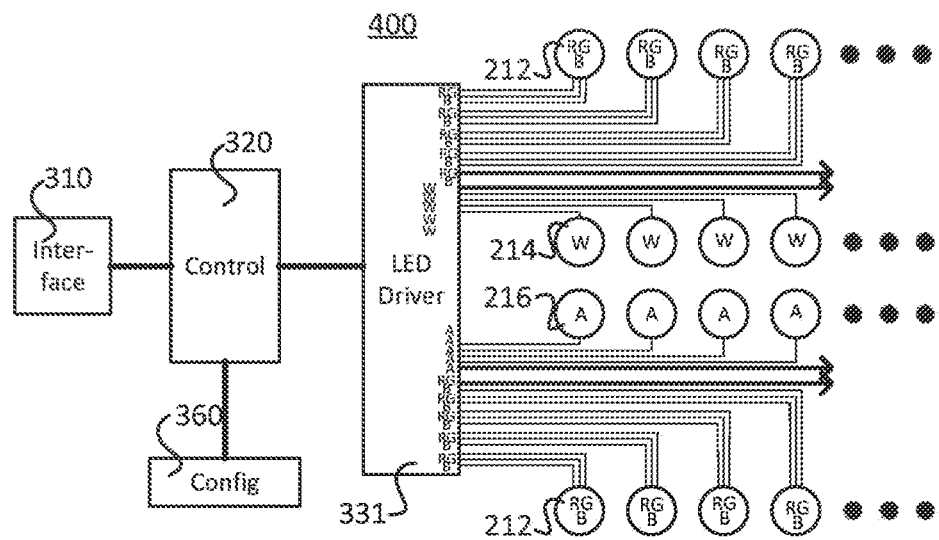
FIG. 11B shows a block diagram of an LED light configured for providing a wide spectral range with individual LED control.

FIG. 11B shows a block diagram of an LED light 400 configured for providing a wide spectral range with individual control over the LEDs 212, 214, 216. As shown in FIG. 11B, an LED driver 331 is wired to each LED component or LED 212, 214, 216. Hence, the LED driver 331 is configured to receive control signals from the controller 320 that provide for individual control over each LED or LED component 212, 214, 216 in the LED light 400 and provide the appropriate/desired power level to each LED. The LEDs 212, 214, 216 may still be configured to operate in groups, e.g., rows or columns, but the controller 320 will provide the grouping, rather than physical wiring within the LED light 400. The configuration interface 360 may provide instructions for grouping the LEDs 212, 214, 216, or the grouping instructions may be received via the interface 310. Note also that the LED Driver 331 may also be configured to provide separate controls over the red, green and blue portions of the RGB LEDs Note that while FIGS. 11A and 11B show a single box for the LED Driver 330 or LED Driver 331, the LED Driver 330 or LED Driver 331 may be implemented with one or more LED driver components. The controller 320 may be one or more processors for decoding instructions and providing control signals to the LED driver 330 or 331. The one or more processors may be processors known in the art, such as microprocessors, microcontrollers, digital signal processors, etc.

Figure 12A:
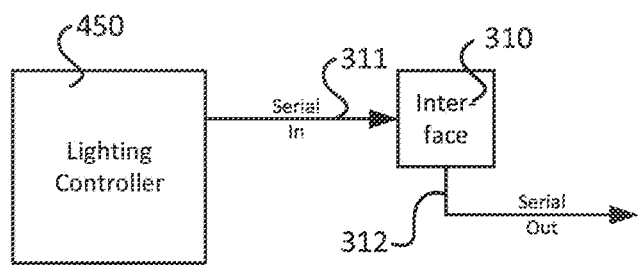
FIG. 12A shows a block diagram of a wired interface to an LED light.

As mentioned above, the interface 310 may be a wired interface One possible wired interface is a serial interface such as shown in FIG. 12A. FIG. 12A shows a serial input 311 to the interface 310 and a serial output 312. The serial input 311 may be coupled to an external lighting system controller 500 or to another LED light. The serial input 311 and serial output 312 may adhere to standard serial specifications known in the art, such as Universal Serial Bus (USB), Digital Multiplex (DMX) 512, Ethernet, etc. DMX 512 is of particular applicability, since the DMX512 standard is a well-known standard in the art used for controlling set or stage lighting and set or stage effects. The DMX512 signaling protocol may also be used with USB physical devices. The serial output 312 may be used to simply retransmit the signals received over the serial input 312 to allow for "daisy-chaining" of devices as described in additional detail below. Lighting controller 450 may include a color scroller or color wheel or DMX slide controllers, or a combination thereof.

Figure 21A:
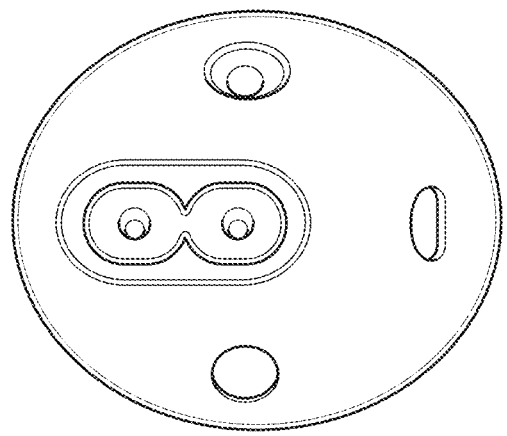
FIGS. 21A and 21B are respective views of alternative end caps for the embodiments of FIGS. 2-4 and 13-14B.
Figure 21B:
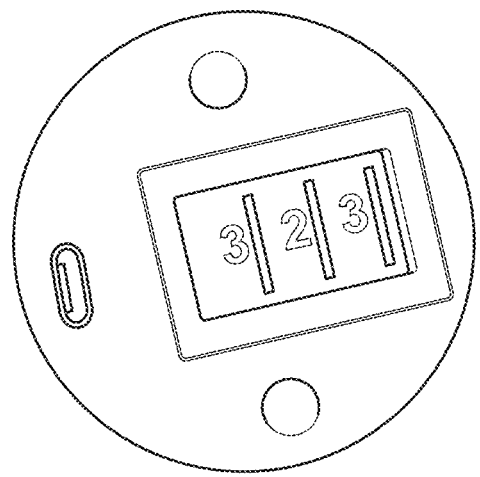

In a variation, there is also an on-board DMX (or code) control knob (on the LED lighting tube's housing) that enables entry of a DMX code (between 1 and 512 channels although one may actually use a selector from zero (0) up to 999 or any other desired code). This enables changing the code or channel of the lighting tube without having to replace the lighting tube. This variation is also shown in FIGS. 21A and 21B, which are variations of the end caps for the lighting tubes shown in any embodiment herein. The end caps of FIGS. 21A and 21B preferably have USB connectors, e.g., each has a female USB connector, so that the lighting tubes may be daisy chained together by USB cables (e.g., having two male ends). In addition, one end cap has the DMX code selector. Accordingly, DMX code of any lighting tube may be changed at any time, without having to rearrange the lighting tubes and/or recode the DMX signal. The other end cap may have a female DC power connector port.

Where USB connectors are used, it may be possible to power the lighting tubes via the power from the USB signal.

In another variation, there may be two or more DMX channels on each lighting tube, and thus two or more control knobs for selecting the DMX code(s) of the lighting tube.

With five different color LEDs, one can use five channels per lighting tube to send a signal and each channel carries a signal indicative of the amount of power to send to each color LED. Setting the DMX address of a lighting tube may therefore correspond to the first channel of the tube, and the controller knows it will receive that channel and the next four channels after that, to control the LED driver signals to the RGBAW LEDs, respectively. The next LED light tube in the universe of lights receiving the DMX signals would be the next five channels, and so on. In some systems, one may want an addition channel for each light to control dimming or other effects, and so each light would receive six channels. If one wants additional control, e.g., to light only some of the LEDs of one color with one intensity and other LEDs of that same color with another intensity at the same time, one may provide additional DMX channels for that lighting tube.

It should be noted that instead of an RGB model, it may be possible to use an HSL or ISV color model.

Figure 12B:
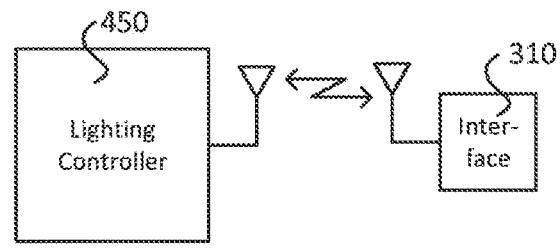
FIG. 12B shows a block diagram of a wireless interface to an LED light.

The interface 310 may also be a wireless interface FIG. 12B shows the interface 310 receiving wireless signals from a lighting system controller 450. The wireless signals may comply with well-known wireless standards such as WiFi or Bluetooth or other wireless protocol. In the wireless configuration, the interface may still be configured to receive signals compliant with the DMX512 signaling protocol or other protocols adapted to provide for control of lighting devices.

Figure 13:
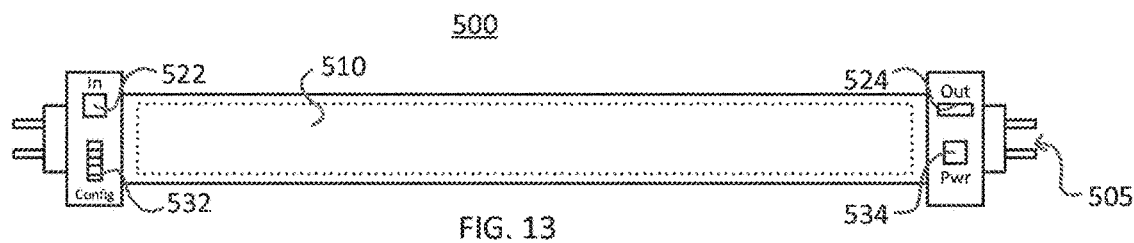
FIG. 13 is a schematic view of an LED light with USB connections.

FIG. 13 is a schematic view of an LED light 500 with USB connections. As shown in FIG. 13, a PCB board 510 containing the LEDs and interface, control and driver electronics is held within a form factor that is roughly equivalent to a T12 size fluorescent tube. The LED light has prongs 505 that are used to hold the LED light 500 within a fluorescent tube fixture. These prongs 505 may also be used to provide AC power to the PCB board 510. The LED light 500 also has a USB input connector 522 and a USB output connector 524. A rotary switch 532 may be used to provide for configuration settings on the LED light 500. The rotary switch 532 may be used to provide the configuration function shown in FIGS. 11A and 11B. Other devices may be used to set the configuration of the LED light Other embodiments may not use a manual switch to set the configuration of the LED light. Such embodiments may use a computer interface such as a USB or Ethernet port, or the LED light may have a permanently set configuration, such as an Ethernet Internet Protocol (IP) address or Media Access Control (MAC) address.

As briefly described above, the LED light 500 shown in FIG. 13 has a PCB board 510 upon which the array of LEDs is mounted. When the LEDs are energized and light up, some mixing of the light from each LED is obtained. However, additional mixing or diffusion of the light may be desired. Therefore, the LED light 500 may also have a shade or diffuser mounted on it, such as the tube 24 shown in FIG. 2. Diffusion of the light from each LED serves to better combine the light that is directed onto the scene to be illuminated.

Figure 14A:
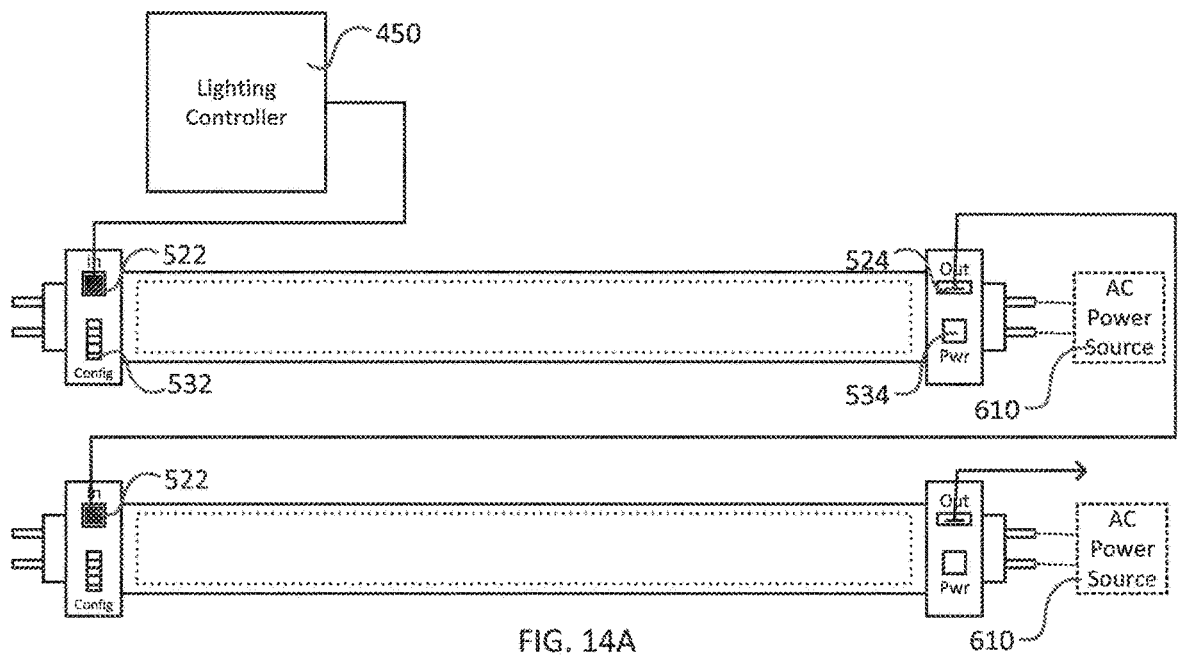
FIG. 14A shows a schematic view of two LED lights coupled together in a "daisy-chain" configuration powered with AC power.
Figure 14B:
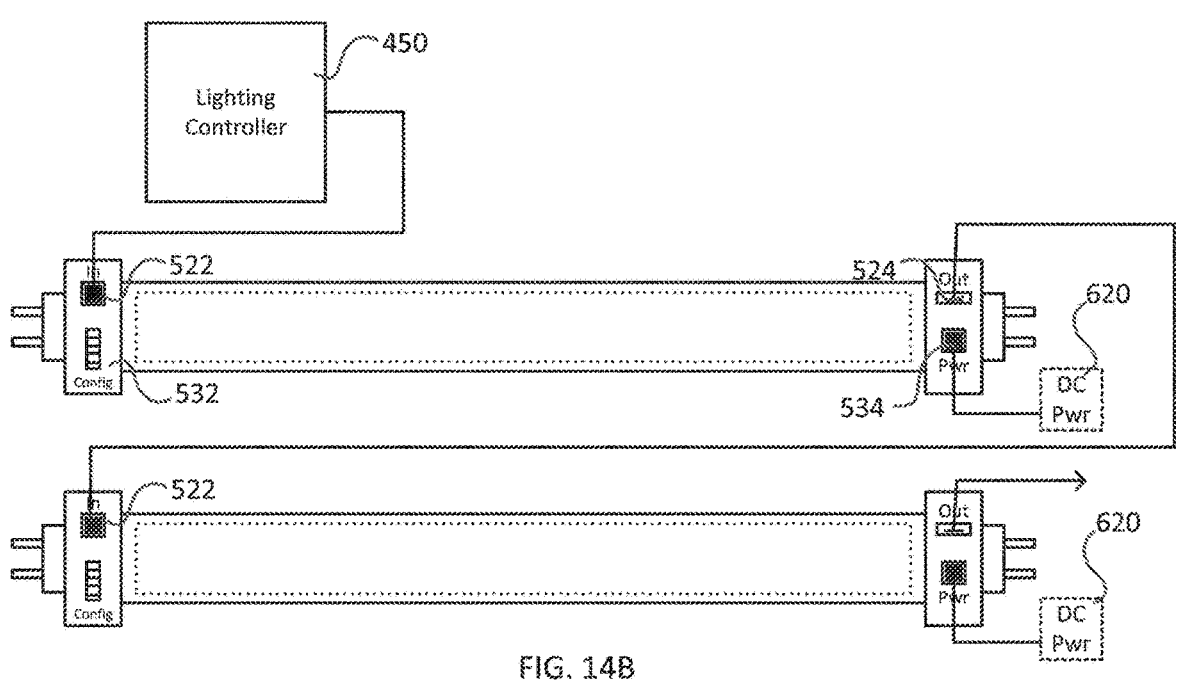
FIG. 14B shows a schematic view of two LED lights coupled together in a "daisy-chain" configuration powered with DC power.

FIG. 14A shows a schematic view of two LED lights 500 coupled together in a "daisy-chain" configuration. The USB input connector 522 of the first LED light is coupled to a USB port on a lighting controller. The USB output connector 524 of the first LED light 500 is coupled to the USB input connector 522 of the second LED light 500. Subsequent LED lights can be coupled in this same fashion. The first LED light receives the USB commands and also passes the USB commands received from the lighting controller to the second light and the second light would pass the USB commands to a third light and so forth. The configuration setting set by the rotary switch 532 determines the USB commands for each LED light 500 FIG. 14A also shows that the LED lights are powered from an external AC power source 610. FIG. 14B shows a similar "daisy-chain" configuration, except that the LED lights 500 are powered from external DC power sources 620 through, for example, USB interfaces. In another embodiment, separate DC power sources 620 may not be used and the power for the LED lights obtained from the USB connection to the lighting controller. In other embodiments, a battery may be used as a power source, which battery may be onboard the lighting tube or physically fixed thereto (or separate).

The lighting controller may be a standard lighting console known in the art, such as the grandMA2 lighting console made by MA Lighting International GmbH (www.MALighting.com, Paderborn, Germany). The lighting controller may contain software that is specially designed to work with the individual LEDs or groups of LEDs in the LED lights 500. Alternatively, the controller within each LED light 500 may be designed to emulate other lighting devices, or a particular output thus eliminating or reducing the need for specialized programming in the lighting controller. Applying the foregoing, an advantageous embodiment for the selection and mounting of LEDs is the combination or cluster of two RGB LEDs, an amber LED and a white LED as shown and described above in various matrix arrangements. The aspect of use of these three types of LEDs in four rows in the fluorescent light fixture (or luminaire) format has been found to be unexpectedly complete in allowing from a practical use standpoint the entire "color wheel" spectrum (preferably 255 color hues) for use in the lighting field with sufficient luminance for stage lighting/entertainment industry applications.

The matrix arrangement of LEDs can be connected to DMX incoming signals (carried, e.g., along DMX cords to DMX connectors or converted to or simply issued in USB format for USB wires and USB connectors) in the many variations that are made available from lighting consoles through DMX processors to provide for any desired variations. Present technology allows the setting of the four rows to selected variables in intensity for each of the four LEDs. An exemplary setting is that the RGB LEDs have a selected intensity, the white LED has a selected intensity and the amber LED has a selected intensity. Typically, in certain lighting systems there could be up to 255 settings (with 8-bit control per channel) and 512 channels, although even more are available with the variations now available in the lighting systems. In addition one or more channels can be set for manual adjustment by sliding controls at the console, so that a lighting condition can be varied as the scene progresses. In any of these whether pre-set channels or manual variation, each color of the LEDs (RGBA or W) would be set the same or varied together and each different color LED would have independent settings or variations from the settings of the other colors as desired to provide desired colors and intensities.

Testing has determined that this columnar arrangement into rows provides even color light emissions across the tube light for the complete spectrum defined by the standard color wheel. It is considered that the RGB LEDs provide the bulk of the color for the color wheel spectrum, the amber LEDs provide remaining hues of yellow and orange, and the white LEDs help provide sufficient luminance.

Lighting technology is considered differently in different applications. In the "studio" or "film" lighting field, it is necessary (as discussed above) to get color temperatures for white light for cinematography, film/photography and broadcast quality applications in the daylight and tungsten temperature ranges discussed elsewhere herein, and most preferably as follows:

3200K indoor
5600K outdoor

Use of the amber LED in the RGB-A-W-RGB columnar arrangement may be controlled to provide white light sufficiently close to or about 3200K and very close to about 5600K.

Also, given that the RGB-A-W-RGB columnar arrangement produces the standard color wheel, the light fixture is useful for cinematographic, theatrical, aesthetic and architectural color uses.

Blending the partly fused or combined light output from this matrix is typically achieved by a diffuser such as in FIG. 2 and FIG. 3 (diffuser 24) and in FIG. 8 (diffuser 91).

In addition to providing the required light constraints and color spectrums, the light fixture can be made responsive to DMX signals, and fit the standard form factor of fluorescent lighting structures.

In particular implementation, the LEDs are configured so as to achieve the right intensities to blend to achieve the color spectrum for DMX control sufficient to provide the full range of 0 to 255 hues (and intensity) mixes on the color spectrum. The LEDs provide the following range of intensity adjustment which thereby allows for an output over a full spectral range:

R: 0 to 100 percent (intensity)
G: 0 to 100 percent (intensity)
B: 0 to 100 percent (intensity)
A: 0 to 100 percent (intensity)
W: 0 to 100 percent (intensity)

It is considered that the RGB LEDs make white light and most of the colors in the 0 to 255 DMX color spectrum. It is further understood that full access to the color spectrum such as the color wheel spectrum can be achieved by inclusion of the amber LED which provides hues in the yellow and orange range so as to fill out the spectrum. It is also considered that inclusion of the white LED for providing increased white light intensity when combined with the amber LED and the RGB LEDs fills out the full spectrum with sufficient intensity.

Figure 15:
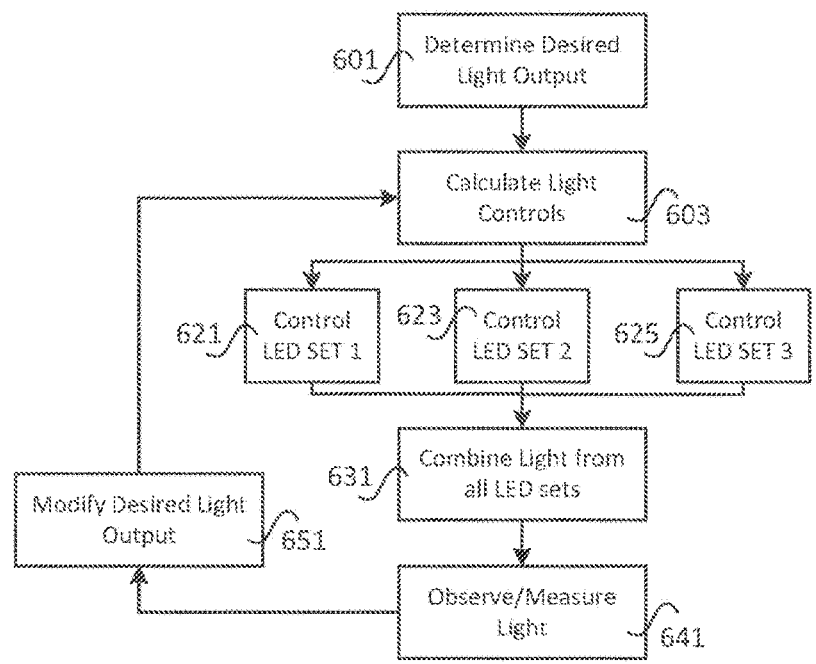
FIG. 15 shows a block diagram of a method for providing light.

FIG. 15 shows a block diagram of a method for providing light according to an embodiment of the present invention. A first step 601 is the determination of the light to be output. This determination can be based upon viewing the environment to be lit, upon a control setting from a control board, consultation from a lighting script, or various other methods or determinations Once the light output is determined, light control commands to obtain the desired light are calculated as shown at step 603. A control console may be used to determine the light control commands. In other applications, a special purpose or general purpose microprocessor may be used. Still other applications may use other methods, techniques, computing hardware, machinery, etc. to calculate the light control commands. These light control commands are then directed to at least three sets of LEDs. The three sets of LEDs are controlled as shown in steps 621, 623, and 625. The light output from each of the three sets of LEDs is combined as shown in step 631. Combination of the light is achieved by locating all of the LEDs in the LED arrays as described above. Further combination of the light may be achieved by using light diffusers or other structures that act to combine the light from individual LEDs. The light is then directed to the environment to be illuminated and the light observed in that environment as shown in step 641. The light may be measured or simple observation may be used to determine if the desired light output has been obtained. If the observed or measured light is not as desired, a modification of the desired light output is made as shown in step 651. This modification is then used to calculate new light control commands in step 603. The modification of the desired light output may be achieved in several ways. For example, simply rotating a dial or other adjustable setting on a control console may modify the desired light output or more complex programming commands and keyboard inputs may be used.

Figure 16:
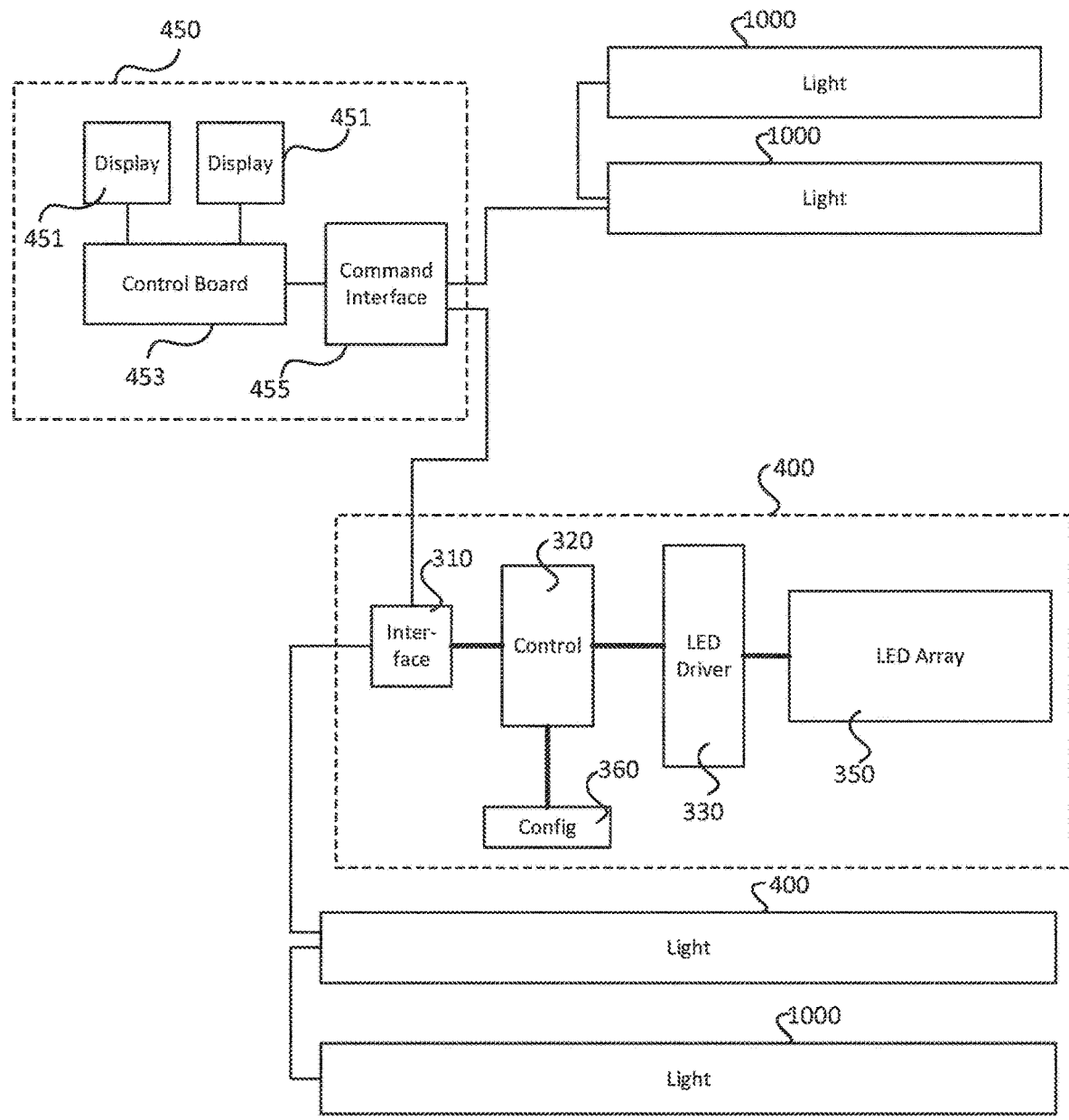
FIG. 16 shows lighting system using LED lights.
Figure 19A:
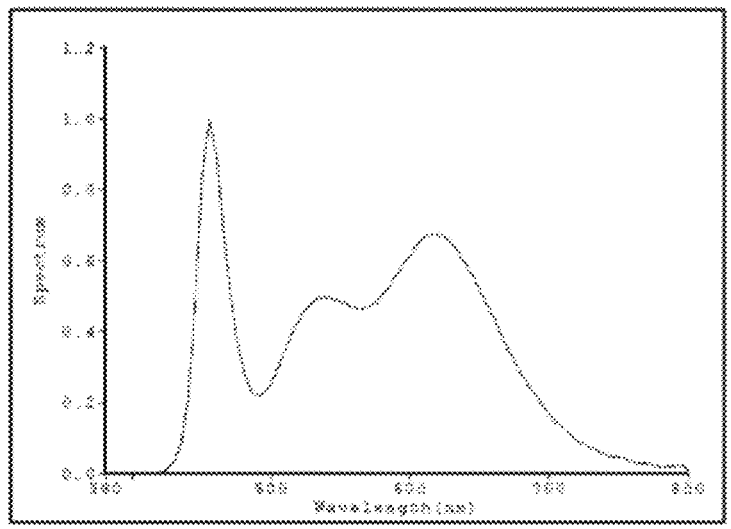
FIG. 19A shows the spectrum output from a 4000K LED.
Figure 19B:
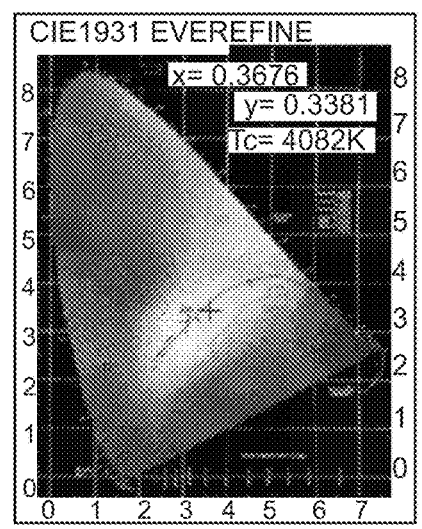
FIG. 19B shows a measured chromaticity diagram from the 4000K LED.
Figure 20A:
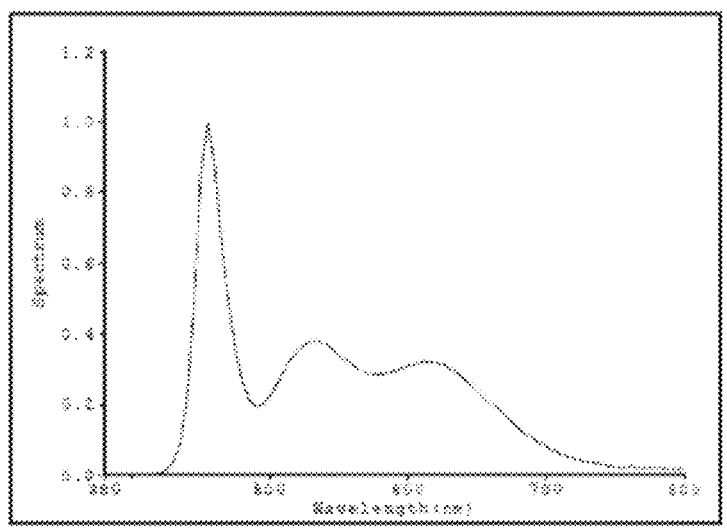
FIG. 20A shows the spectrum output from a 5500K LED.
Figure 20B:
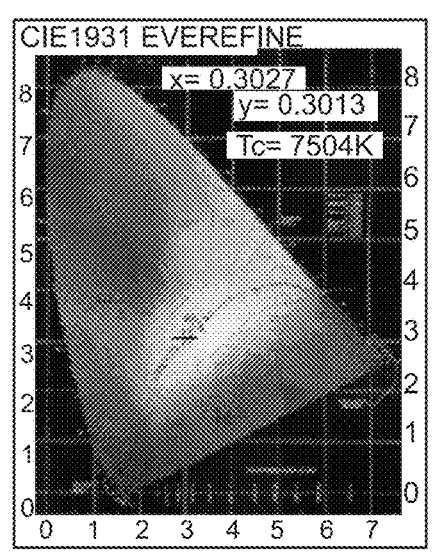
FIG. 20B shows a measured chromaticity diagram from the 5500K LED

FIG. 16 shows a lighting system using LED lights according to the present invention. In FIG. 16 a lighting console 450 is used to control multiple lights 400, 1000. The lighting console may have a control board 453 and multiple displays 451. The control board 453 may be a simple keyboard or more complex control interfaces. The control board is coupled to a command interface 455 that is configured to provide lighting commands to multiple lighting devices. The command interface may utilize the DMX 512 protocol described above, other standard lighting protocols known in the art, or proprietary protocols. The command interface 455 may use other electrical interfaces, such as Ethernet, USB, etc. The lighting console 450 may be a commercial console known in the art, such as the grandMA2, or other such consoles.

The command interface 455 may be coupled to several lighting fixtures that may be configured in a daisy-chain configuration. FIG. 16 shows a first LED light 400 coupled to a second LED light 400 which is coupled to a generic light 1000. The generic light 1000 may be another LED light 400 according to the present invention or another type of lighting device. The LED light 400 may be configured to couple to many types of other lighting devices FIG. 16 also shows a second daisy chain of lights 1000, which again may be LED lights 400 or other types of lighting devices. The LED light 400 may have the interface 310 that allows the light to receive and send light commands. The interface 310 is coupled to the LED light control 320 which provides control over the LEDs in the LED array 350. The interface 310 may utilize additional channels in DMX512 protocol so as to allow signals to the LEDs in such groupings as by row or column, or by type of LED, and even to the extent of allowing control of each LED individually. Additional signal channels such as through splitters can be established. An LED driver is used to power the LEDs in the LED array 350. A config function 360 provides the ability to configure the LED light 400 as discussed above. As shown in FIG. 16, the LED light 400 may be configured to work with existing lighting devices 1000 and consoles 450.

The LEDs herein are preferably formed as an LED Strip Light, defined as follows:

An LED Strip Light (also known as an LED tape or ribbon light) is a flexible strip of surface mounted light-emitting diodes that usually comes with an adhesive backing.

LED Strip Lights require a driver and typically operate on 12 or 24 volts of direct current from the driver. USB strip lights operate on the standard 5-volt direct current used by USB devices. Any customizations require an LED controller to adjust brightness, color, or individual LED activity.

The lighting tube of the present invention preferably uses LED Strip Lights with the constraints (although other constraints are possible), for a T12 fluorescent tube form factor having approximately a one inch diameter, that preferably
- a) the strip width is one inch or less than one inch;
- b) the LEDs in each column are within the strip width, and preferably packed to two centimeters (2 cm) and most preferably to less than two centimeters (2 cms);
- c) that the strip is no less than 12 inches long and no more than 48 inches long (and most preferably less than 48 inches (e.g., approximately 45 inches plus or minus about two inches);
- d) that there are preferably about 39 columns of LEDs per foot, and 144 columns of LEDs for the strip; and
- e) the diffuser is a typical standard diffusing material, e.g., plastic translucent diffuser having a one inch diameter, and most preferably smooth (to avoid lines).

The T12 form factor has very limited space to achieve sufficient light output from LEDs, sufficient color output, and sufficient color uniformity to the naked eye, to achieve a light suitable for the entertainment industry. In another embodiment, the input voltage (e.g., if source is AC then by transformer/rectifier) is 48 volts DC.

One example of suitable LEDs for constructing such a lighting tube and achieving desired luminosity is shown below:

| T12-RGBAW | | | | | | |
|---|---|---|---|---|---|---|
| R Gray-scale | G Gray-scale | B Gray-scale | A Gray-scale | W Gray-scale | Power (W) | Luminous (lm) |
| 255 | 0 | 0 | 0 | 0 | 6.84 | 164.28 |
| 0 | 255 | 0 | 0 | 0 | 6.84 | 486.20 |
| 0 | 0 | 255 | 0 | 0 | 9.82 | 164.93 |
| 0 | 0 | 0 | 255 | 0 | 8.71 | 173.95 |
| 0 | 0 | 0 | 0 | 255 | 6.29 | 268.12 |
| 255 | 255 | 255 | 255 | 255 | 28.13 | 1222.20 |

Taking into account luminosity and power values for the RGBAW LEDs, one may calibrate an LED driver for a typical DMX color chart (signal level from 0 to 255), e.g., such as below:

| DMX Channel Value | Display Readout | Red Value | Green Value | Blue Value | White Value | Amber Value |
|---|---|---|---|---|---|---|
| 000-005 | | 000 | 000 | 000 | 000 | 000 |
| 006-013 | C90Y | 255 | 250 | 000 | 020 | 255 |
| 014-021 | R11 | 255 | 213 | 000 | 020 | 255 |
| 022-028 | R312 | 255 | 216 | 000 | 000 | 190 |
| 029-035 | R03 | 240 | 129 | 002 | 072 | 255 |
| 036-043 | R18 | 245 | 108 | 000 | 035 | 255 |
| 044-051 | R20 | 255 | 109 | 000 | 000 | 255 |
| 052-059 | R21 | 170 | 039 | 000 | 000 | 255 |
| 060-067 | R26 | 245 | 002 | 000 | 000 | 031 |
| 068-075 | R27 | 255 | 000 | 000 | 002 | 000 |
| 076-083 | R33 | 042 | 000 | 000 | 245 | 234 |
| 084-091 | R337 | 155 | 064 | 006 | 165 | 255 |
| 092-099 | R38 | 226 | 154 | 024 | 045 | 255 |
| 100-107 | R41 | 255 | 008 | 000 | 010 | 150 |
| 108-115 | R42 | 255 | 006 | 000 | 024 | 055 |
| 116-121 | R44 | 255 | 041 | 010 | 130 | 000 |
| 122-130 | R349 | 255 | 027 | 024 | 000 | 000 |
| 131-138 | R54 | 173 | 226 | 042 | 080 | 255 |
| 139-146 | R64 | 000 | 255 | 062 | 099 | 215 |
| 147-154 | R364 | 000 | 185 | 039 | 255 | 205 |
| 155-162 | R65 | 000 | 239 | 062 | 205 | 000 |
| 163-170 | R80 | 000 | 249 | 205 | 011 | 000 |
| 171-178 | R81 | 000 | 248 | 117 | 108 | 000 |
| 179-186 | R82 | 000 | 239 | 062 | 205 | 000 |
| 187-194 | R382 | 020 | 000 | 255 | 000 | 000 |
| 195-202 | R83 | 000 | 144 | 255 | 000 | 000 |
| 203-210 | R383 | 000 | 034 | 255 | 031 | 000 |
| 211-218 | R91 | 000 | 255 | 000 | 084 | 035 |
| 219-226 | R92 | 043 | 255 | 003 | 255 | 055 |
| 227-234 | R93 | 063 | 255 | 015 | 125 | 000 |
| 235-242 | R393 | 000 | 255 | 022 | 070 | 000 |
| 243-250 | R90 | 005 | 255 | 000 | 000 | 015 |
| 251-255 | | 000 | 000 | 000 | 000 | 000 |

When using DMX, e.g., DMX 512, there are 512 channels. Each channel may have a signal value between 0 and 255. DMX is often used for dimming control of lighting devices. Lower DMX values refer to lower light level for a particular device. Each channel typically controls one device. Each device is assigned a particular DMX channel or channels. For example, a first device may have the first DMX channel assigned to it, a second device may have a second DMX channel assigned to it, and so on. The signal value in the corresponding channel then goes to a DMX decoder which then sends a control signal corresponding to the DMX value to control that device or LED color.

To use DMX, there is a DMX controller to issue the signals, a DMX cable or cables to carry the signals, a DMX decoder or decoders to receive the signals and send the particular signal intended to a particular device.

As noted above, the DMX value is between 0 and 255 (a one byte (eight bit) binary signal).

In addition to dimming, such DMX signals may be used to create colors from color lights. Usually one mixes different levels of Red, Green and Blue lights to achieve various different colors. If a red light is on DMX channel one, a green light is on DMX channel two, and a blue light is on DMX channel three, varying the DMX values in each of the channels to vary the intensity outputs of the red, green and blue lights will then vary the color mixing, and achieve different color outputs. A simple example is if the red light DMX signal value is 255, and green and blue are at a value of 0, the output will be red. If the green light DMX signal value is 255 and the other lights are at 0, the color output is green. If the blue light is at 255 and the other lights are at 0, the color output is blue. Varying the signal levels between those amounts for each light will produce various colors.

Several existing computer programs handle the color mixing, such as QS DMX Color Configuration Tool by Lutron Electronics Co., Inc. of Coopersburg, Pennsylvania (see also www.Lutron.com). One may need to select what color lights are being mixed (Red, Green, Blue, or Red, Green, Blue, White, or Red, Green, Blue, Amber and White), and then enter some specifications for the light output of each color as is known in the art. The program will then issue the appropriate DMX signals from the controller to produce the selected colors on a color wheel.

In other words, the color mixing chart and formula is designed into lighting control panels (such as grandMA2) or obtained (such as from Lutron.com), so that the controller will issue DMX512 signals corresponding to the color wheel of 255 colors. Such control panels enable on the fly control of the lights, or programmed control. Operation of the grandMA2 and other lighting control panels is well known in the art.

The corresponding eight bit settings of each DMX signal to achieve each color is therefore known.

Each DMX channel is at 0 to 255 in values of the eight bit code for each individual color.

A normal LED driver drives LEDs at one percent increments for dimming and color mixing. The manufacturer of an LED color chip may provide the color specifications, i.e., the color mixing chart that shows the percentages of each color LED that are needed to achieve different colors. Color mixing of LEDs is not normally able to achieve the same color mixing as the DMX color mixing of nonLEDs.

By arranging the LEDs in the inventive matrices and by using the full RGBAW array for that arrangement, the inventor found that the LEDs can be made to achieve the color spectrum of the color wheel used in DMX controllers.

Each of the 1 to 100 percent for dimming LEDs represents a signal level of 2.55 in the DMX protocol or system. Therefore, 100% in LED output level control equals 255 in DMX output level, and 0% in LED output level control equals 0 signal level in DMX. Therefore, $\frac{1}{255}$ or 0.3921568% LED output signal level achieves 1 DMX increment. Using this relationship, an LED driver value for each color LED (RGBAW) may be determined that corresponds to each eight bit DMX value for each color (RGBAW). Therefore, one can build an LED driver to increment from 0% to 100% in increments of 0.3921568% (about 0.4%) in response to the appropriate or corresponding DMX signal value. Therefore, one can create an LED driver to match the DMX values and achieve the same color spectrum of 255 (or 256) colors as in a DMX controlled color light.

Each eight bit DMX signal carried on a channel represents a state of control of each corresponding LED. With five LEDs (RGBAW) on each lighting tube, five DMX channels are required to control the LEDs such tube.

So, the LED driver in accordance with the invention is made to move in more finite movements than a standard LED 1 to 100 driver, i.e., into 255 separate signals.

The color blends are determined by the color wheel, which in turn sends out the appropriate DMX signals to control the LEDs.

The total LED output intensities of the RGBAW are selected to achieve white light at full intensity of each LED.

Each lamp is individually addressable.

Delivery of the lighting control information to the RGBAW lighting tube may, e.g., be via an input connector such as for data like a USB or a DMX input.

Data or DMX signals need to be delivered to the lighting tube, preferably using a three wire connection: 1 (common), 1− (Negative), 1+ (Positive).

As noted above, there is also the ability to pass thru Data/DMX signal from one lighting tube to the next in a daisy chain manner.

One may use a USB, mini USB or a micro USB connector. Alternatively, the specific data carrying method to the lighting tube can vary, such as wireless (with a wireless onboard receiver) or other ways. There are many types of connectors that the Data/DMX signal to be transmitted or connected.

Additional variations to any and all of the above disclosed embodiments.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

The invention claimed is:

1. An LED lighting device configured for providing light suitable for a commercial image recording, the LED lighting device comprising:
   (a) a support structure;
   (b) a housing for the support structure;
   (c) an array of LED emitting devices mounted on the support structure,
   wherein the array of LED emitting devices is configured to emit five different colors of light and comprises: a first set of LED emitting elements configured to emit light of a first color; a second set of LED emitting elements configured to emit light of a second color; a third set of LED emitting elements configured to emit light of a third color; a fourth set of LED emitting elements configured to emit light of at a fourth color; and a fifth set of LED emitting elements configured to emit a broad-spectrum white light within a predetermined Kelvin temperature range; and
   (d) a controller coupled to the array of LED emitting devices and configured to receive commands for operating select ones of the LED emitting devices with varying amounts of power to produce light consisting of varying amounts of the five different colors provided by the first, second, third, fourth, and fifth sets of LED emitting elements to produce many different colors outputted from the lighting device, and further comprising an LED driver, the LED driver configured to selectively provide electrical power to the array of LED emitting devices;
   (e) wherein the housing has a linear form factor substantially that of a fluorescent tube having an axial direction and a narrow diameter in relation to the length, and further comprising an electrical input connection for receiving input power, wherein the input connection is in electrical communication with the LED driver;
   (f) wherein the housing has opposite ends and the support structure is in a form of an elongated and narrow surface extending in the axial direction and the housing having a top side and a bottom side which each extend in the axial direction, and wherein the LEDs are configured to emit light from the top side of the housing along a length of the housing between the opposite ends, and the top side of the housing has a diffusion cover extending the axial length of the support between the ends;
   (g) wherein the housing has a linear form factor substantially that of a fluorescent tube of one of a T12 and T8 form and the housing has a length of about four feet and a diameter of no greater than about 41 mm, wherein the LED emitting elements are on a strip no more than about one inch wide and the LEDs are packed to within about two centimeters in width;
   (h) wherein the lighting device is configured to receive an input wattage of at least 40 watts, the electrical input connection is configured to receive AC input power and has at least one of an inverter and a power supply in the housing and the LED driver is disposed within the housing and is configured to provide up to the at least 40 watts to the LEDs;
   (i) wherein the LED driver constitutes a first LED driver for providing driving currents to the LED emitting devices providing the output of tungsten white light and the LED lighting device further comprises a second LED driver for providing driving currents to the LED emitting devices providing the output of daylight white light;

(j) wherein the LED controller is configured to control the first and second LED drivers to selectively provide an output of tungsten white light with substantially no daylight white and of daylight white light with substantially no tungsten white light from among the many different colors outputted from the lighting device, and wherein each of the tungsten white light output is suitable for the commercial image recording industry and wherein the daylight white light output is suitable for the commercial image recording industry;

(k) wherein the tungsten white light output with substantially no daylight white from the LED lighting device is suitable for the commercial image recording industry when the tungsten white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90; and (l) wherein the daylight white light output with substantially no tungsten white from the LED lighting device is suitable for the commercial image recording industry when the daylight white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90.

2. The LED lighting device of claim 1, wherein the lighting device is configured to receive an input wattage of at least 50 watts, the electrical input connection is configured to receive AC input power and has at least one of an inverter and a power supply in the housing and the LED driver is disposed within the housing and is configured to provide up to the at least 50 watts to the LEDs.

3. The LED lighting device of claim 2, wherein the first, second, third, fourth and fifth sets of LED light emitting elements are in multiple rows and evenly dispersed along the length of the housing.

4. The LED lighting device of claim 1, wherein the LED driver is adapted for selectively driving each of the first set, second set, third set, fourth set and fifth set of LED emitting elements in increments of about 1/255 to selectively produce at least 255 different colors from the lighting device, and wherein the LED driver is adapted for selectively driving each of the first set, second set, third set, fourth set and fifth set of LED emitting elements in response to DMX signals from an external computer console or lighting control board to selectively produce the at least 255 different colors of an entertainment industry color wheel emitted from the lighting device.

5. The LED lighting device of claim 4, wherein there are multiple LED lighting devices, and there is an external controller for the lighting devices, the lighting devices each having a selector mechanism for being individually addressable by the external controller.

6. The LED lighting device of claim 1, wherein the housing has at least one of a USB port for communication with the controller proximate each of the opposite ends of the housing for communication with the controller and means for receiving wireless signals to communicate with the controller.

7. An LED lighting device configured for providing light suitable for a commercial image recording, the LED lighting device comprising:

(a) a support structure;

(b) a housing for the support structure;

(c) an array of LED emitting devices mounted on the support structure,
wherein the array of LED emitting devices is configured to emit five different colors of light and comprises: a first set of LED emitting elements configured to emit light of a first color; a second set of LED emitting elements configured to emit light of a second color; a third set of LED emitting elements configured to emit light of a third color; a fourth set of LED emitting elements configured to emit light of at a fourth color; and a fifth set of LED emitting elements configured to emit a broad-spectrum white light within a predetermined Kelvin temperature range; and (d) a controller coupled to the array of LED emitting devices and configured to receive commands for operating select ones of the LED emitting devices with varying amounts of power to produce light consisting of varying amounts of the five different colors provided by the first, second, third, fourth, and fifth sets of LED emitting elements to produce many different colors outputted from the lighting device, and further comprising an LED driver, the LED driver configured to selectively provide electrical power to the array of LED emitting devices;

(e) wherein the housing has a linear form factor substantially that of a fluorescent tube having an axial direction and having a length of at least one foot and a narrow diameter in relation to the length, and further comprising an electrical input connection for receiving input power, wherein the input connection is in electrical communication with the LED driver;

(f) wherein the housing has opposite ends and the support structure is in a form of an elongated and narrow surface extending in the axial direction and the housing having a top side and a bottom side which each extend in the axial direction, and wherein the LEDs are configured to emit light from the top side of the housing along a length of the housing between the opposite ends, and the top side of the housing has a diffusion cover extending the axial length of the support between the ends;

(g) wherein the housing has a linear form factor substantially that of a fluorescent tube of one of a T12 and T8 form and the housing has a length of no greater than about four feet and a diameter of no greater than about 41 mm, wherein the LED emitting elements are on a strip no more than about one inch wide and the LEDs are packed to within about two centimeters in width;

(h) wherein the lighting device is configured to receive an input wattage of at least 40 watts, the electrical input connection is configured to receive AC input power and has at least one of an inverter and a power supply in the housing and the LED driver is disposed within the housing and is configured to provide up to the at least 40 watts to the LEDs;

(i) wherein the LED driver constitutes a first LED driver for providing driving currents to the LED emitting devices providing the output of tungsten white light and the LED lighting device further comprises a second LED driver for providing driving currents to the LED emitting devices providing the output of daylight with light;

(j) wherein the LED controller is configured to control the first and second LED drivers to selectively provide an output of tungsten white light with substantially no daylight white and of daylight white light with substantially no tungsten white light among the many different colors outputted from the lighting device;

(k) wherein the tungsten white light output with substantially no daylight white from the LED lighting device is suitable for the commercial image recording industry when the tungsten white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90; and (l) wherein the daylight white light output with substantially no tungsten white from the LED lighting device is suitable for the commercial image recording industry when the daylight white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90.

8. The LED lighting device of claim 7, wherein the first, second, third, fourth and fifth sets of LED light emitting elements are in multiple rows and evenly dispersed along the length of the housing.

9. The LED lighting device of claim 7, wherein the LED driver is adapted for selectively driving each of the first set, second set, third set, fourth set and fifth set of LED emitting elements in increments of about 1/255 to selectively produce at least 255 different colors from the lighting device, wherein the LED driver is adapted for selectively driving each of the first set, second set, third set, fourth set and fifth set of LED emitting elements in response to DMX signals from an external computer console or lighting control board to selectively produce the at least 255 different colors of an entertainment industry color wheel emitted from the lighting device, and wherein there are multiple LED lighting devices, and there is an external controller for the lighting devices, the lighting devices each having a selector mechanism for being individually addressable by the external controller.

10. The LED lighting device of claim 7, wherein the housing has at least one of a USB port for communication with the controller proximate each of the opposite ends of the housing for communication with the controller and means for receiving wireless signals to communicate with the controller.

11. An LED lighting device configured for providing light suitable for a commercial image recording, the LED lighting device comprising:

(a) a support structure;

(b) a housing for the support structure;

(c) an array of LED emitting devices mounted on the support structure, wherein the array of LED emitting devices is configured to emit five different colors of light and comprises: a first set of LED emitting elements configured to emit light of a first color; a second set of LED emitting elements configured to emit light of a second color; a third set of LED emitting elements configured to emit light of a third color; a fourth set of LED emitting elements configured to emit light of at a fourth color; and a fifth set of LED emitting elements configured to emit a broad-spectrum white light within a predetermined Kelvin temperature range; and (d) a controller coupled to the array of LED emitting devices and configured to receive commands for operating select ones of the LED emitting devices with varying amounts of power to produce light consisting of varying amounts of the five different colors provided by the first, second, third, fourth, and fifth sets of LED emitting elements to produce many different colors outputted from the lighting device, and further comprising an LED driver, the LED driver configured to selectively provide electrical power to the array of LED emitting devices;

(e) wherein the housing has a linear form factor substantially that of a fluorescent tube having an axial direction and a narrow diameter in relation to the length, and further comprising an electrical input connection for receiving input power, wherein the input connection is in electrical communication with the LED driver;

(f) wherein the housing has opposite ends and the support structure is in a form of an elongated and narrow surface extending in the axial direction and the housing having a top side and a bottom side which each extend in the axial direction, and wherein the LEDs are configured to emit light from the top side of the housing along a length of the housing between the opposite ends, and the top side of the housing has a diffusion cover extending the axial length of the support between the ends;

(g) wherein the housing has a linear form factor substantially that of a fluorescent tube of one of a T12 and T8 form and the housing has a length of about four feet and a diameter of no greater than about 41 mm, wherein the LED emitting elements are on a strip no more than about one inch wide and the LEDs are packed to within about two centimeters in width;

(h) wherein the lighting device is configured to receive an input wattage of at least 40 watts, the electrical input connection is configured to receive AC input power and has at least one of an inverter and a power supply in the housing and the LED driver is disposed within the housing and is configured to provide up to the at least 40 watts to the LEDs;

(i) wherein the LED driver constitutes a first LED driver for providing driving currents to the LED emitting devices providing the output of tungsten white light and the LED lighting device further comprises a second LED driver for providing driving currents to the LED emitting devices providing the output of daylight with light;

(j) wherein the LED controller is configured to control the first and second LED drivers to selectively provide an output of tungsten white light with substantially no daylight white and of daylight white light with substantially no tungsten white light among the many different colors outputted from the lighting device;

(k) wherein the first, second, third, fourth and fifth sets of LED light emitting elements are in multiple rows and evenly dispersed along the length of the housing;

(l) wherein the tungsten white light output is suitable for the commercial image recording industry and wherein the daylight white light output is suitable for the commercial image recording industry;

(m) wherein the tungsten white light output with substantially no daylight white from the LED lighting device is suitable for the commercial image recording industry when the tungsten white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90; and (n) wherein the daylight white light output with substantially no tungsten white from the LED lighting device is suitable for the commercial image recording industry when the daylight white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90.

12. The LED lighting device of claim 11, wherein the LED driver is adapted for selectively driving each of the first set, second set, third set, fourth set and fifth set of LED emitting elements in response to DMX signals from an external computer console or lighting control board to selectively produce at least 255 different colors of an entertainment industry color wheel emitted from the lighting device, and wherein the housing has end caps at each end thereof, and one of the end caps has a DMX selector thereon.

13. The LED lighting device of claim 11, wherein the LED driver is adapted for selectively driving each of the first set, second set, third set, fourth set and fifth set of LED emitting elements in response to DMX signals from an external computer console or lighting control board to selectively produce at least 255 different colors of an entertainment industry color wheel emitted from the lighting device, wherein there are multiple LED lighting devices, and there is an external controller for the lighting devices, the lighting devices each having a selector mechanism for being individually addressable by the external controller, wherein the housing has end caps at opposite ends, and wherein one of the end caps has a USB port for communication with a controller.

14. The LED lighting device of claim 11, wherein the LED driver is adapted for selectively driving each of the first set, second set, third set, fourth set and fifth set of LED emitting elements in response to DMX signals from an external computer console or lighting control board to selectively produce at least 255 different colors of an entertainment industry color wheel emitted from the lighting device, wherein there is means for receiving wireless signals to communicate with the controller.

15. The LED lighting device of claim 7, wherein the lighting device is configured to receive an input wattage of at least 50 watts, the electrical input connection is configured to receive AC input power and has at least one of an inverter and a power supply in the housing and the LED driver is disposed within the housing and is configured to provide up to the at least 50 watts to the LEDs.

16. The LED lighting device of claim 11, wherein the lighting device is configured to receive an input wattage of at least 50 watts, the electrical input connection is configured to receive AC input power and has at least one of an inverter and a power supply in the housing and the LED driver is disposed within the housing and is configured to provide up to the at least 50 watts to the LEDs.

17. An LED lighting device configured for providing light suitable for a commercial image recording, the LED lighting device comprising:

(a) a support structure;
(b) a housing for the support structure;
(c) an array of LED emitting devices mounted on the support structure,
    wherein the array of LED emitting devices is configured to emit four different colors of light and comprises: a first set of LED emitting elements configured to emit light of a first color; a second set of LED emitting elements configured to emit light of a second color; a third set of LED emitting elements configured to emit light of a third color; and a fourth set of LED emitting elements configured to emit a broad-spectrum white light within a predetermined Kelvin temperature range; and
(d) a controller coupled to the array of LED emitting devices and configured to receive commands for operating select ones of the LED emitting devices with varying amounts of power to produce light consisting of varying amounts of the four different colors provided by the first, second, third, and fourth sets of LED emitting elements to produce many different colors outputted from the lighting device, and further comprising an LED driver, the LED driver configured to selectively provide electrical power to the array of LED emitting devices;
(e) wherein the housing has a linear form factor substantially that of a fluorescent tube having an axial direction and a narrow diameter in relation to the length, and further comprising an electrical input connection for receiving input power, wherein the input connection is in electrical communication with the LED driver;
(f) wherein the housing has opposite ends and the support structure is in a form of an elongated and narrow surface extending in the axial direction and the housing having a top side and a bottom side which each extend in the axial direction, and wherein the LEDs are configured to emit light from the top side of the housing along a length of the housing between the opposite ends, and the top side of the housing has a diffusion cover extending the axial length of the support between the ends;
(g) wherein the housing has a linear form factor substantially that of a fluorescent tube of one of a T12 and T8 form and the housing has a length of about four feet and a diameter of no greater than about 41 mm, wherein the LED emitting elements are on a strip no more than about one inch wide and the LEDs are packed to within about two centimeters in width;
(h) wherein the lighting device is configured to receive an input wattage of at least 40 watts, the electrical input connection is configured to receive AC input power and has at least one of an inverter and a power supply in the housing and the LED driver is disposed within the housing and is configured to provide up to the at least 40 watts to the LEDs;
(i) wherein the LED driver provides driving currents to the LED emitting devices providing the output of tungsten white light, the output of daylight white light and output in colored light;
(j) wherein the LED controller is configured to control the LED driver to selectively provide an output of tungsten white light with substantially no daylight white and of daylight white light with substantially no tungsten white light among the many different colors outputted from the lighting device, and wherein the tungsten white light output is suitable for the commercial image recording industry and wherein the daylight white light output is suitable for the commercial image recording industry, and (k) wherein said emitted light is suitable for the commercial image recording industry when said emitted light: (i) is at least 1000 lumens when the first LEDs are lit and is also at least 1000 lumens when the second LEDs are lit; (ii) is broad-spectrum white light having a color deviation corresponding to less than five points of green and less than five points of magenta (5M, 5G) of color compensation (CC), and (iii) has a color rendering index of light emitted from each of the first LEDs or each of the second LEDs, whichever respective plurality of first or second LEDs is lit, that is greater than 90.

18. The LED lighting device of claim 17, wherein the housing is about four feet long and the lighting device is configured to receive an input wattage of at least 50 watts, the electrical input connection is configured to receive AC input power and has at least one of an inverter and a power supply in the housing and the LED driver is disposed within the housing and is configured to provide up to the at least 50 watts to the LEDs.

19. The LED lighting device of claim 18, wherein the first, second, third, and fourth sets of LED light emitting elements are in multiple rows and evenly dispersed along the length of the housing.

20. The LED lighting device of claim 17, wherein the LED driver is adapted for selectively driving each of the first set, second set, third set, and fourth set of LED emitting elements in increments of about 1/255 to selectively produce at least 255 different colors from the lighting device, wherein the LED driver is adapted for selectively driving each of the first set, second set, third set, and fourth set of LED emitting elements in response to DMX signals from an external computer console or lighting control board to selectively produce the at least 255 different colors of an entertainment industry color wheel emitted from the lighting device, and wherein there are multiple LED lighting devices, and there is an external controller for the lighting devices, the lighting devices each having a selector mechanism for being individually addressable by the external controller, and wherein the housing has at least one of a USB port for communication with the controller proximate each of the opposite ends of the housing for communication with the controller and means for receiving wireless signals to communicate with the controller.

21. The LED lighting device of claim 17, wherein the LED driver constitutes a first LED driver for providing driving currents to the LED emitting devices providing the output of tungsten white light and the LED lighting device further comprises a second LED driver for providing driving currents to the LED emitting devices providing the output of daylight white light.

22. An LED lighting device configured for providing light suitable for a commercial image recording, the LED lighting device comprising:

(a) a support structure;
(b) a housing for the support structure;
(c) an array of LED emitting devices mounted on the support structure, wherein the array of LED emitting devices is configured to emit four different colors of light and comprises: a first set of LED emitting elements configured to emit light of a first color; a second set of LED emitting elements configured to emit light of a second color; a third set of LED emitting elements configured to emit light of a third color; and a fourth set of LED emitting elements configured to emit a broad-spectrum white light within a predetermined Kelvin temperature range;

(d) a controller coupled to the array of LED emitting devices and configured to receive commands for operating select ones of the LED emitting devices with varying amounts of power to produce light consisting of varying amounts of the four different colors provided by the first, second, third and fourth sets of LED emitting elements to produce many different colors outputted from the lighting device, and further comprising an LED driver, the LED driver configured to selectively provide electrical power to the array of LED emitting devices;

(e) wherein the housing has a linear form factor substantially that of a fluorescent tube having an axial direction and a narrow diameter in relation to the length, and further comprising an electrical input connection for receiving input power, wherein the input connection is in electrical communication with the LED driver;

(f) wherein the housing has opposite ends and the support structure is in a form of an elongated and narrow surface extending in the axial direction and the housing having a top side and a bottom side which each extend in the axial direction, and wherein the LEDs are configured to emit light from the top side of the housing along a length of the housing between the opposite ends, and the top side of the housing has a diffusion cover extending the axial length of the support between the ends;

(g) wherein the housing has a linear form factor substantially that of a fluorescent tube of one of a T12 and T8 form;

(h) wherein the lighting device is configured to receive an input wattage, the electrical input connection is configured to receive AC input power and has at least one of an inverter and a power supply in the housing and the LED driver is disposed within the housing and is configured to provide up to the input wattage to the LEDs;

(i) wherein the LED controller is configured to control the LED driver to selectively provide an output of tungsten white light with substantially no daylight white and of daylight white light with substantially no tungsten white light from among the many different colors outputted from the lighting device, and wherein each of the tungsten white light output is suitable for the commercial image recording industry and wherein the daylight white light output is suitable for the commercial image recording industry;

(j) wherein the tungsten white light output with substantially no daylight white from the LED lighting device is suitable for the commercial image recording industry when the tungsten white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90; and (l) wherein the daylight white light output with substantially no tungsten white from the LED lighting device is suitable for the commercial image recording industry when the daylight white light outputted from the LED lighting device: (i) is at least 1000 lumens; (ii) is broad-spectrum white light having a color deviation corresponding to less than five points of green and less than five points of magenta (5M, 5G) of color compensation (CC), and (iii) has a color rendering index of light greater than 90.

23. The LED lighting device of claim 22, wherein the LED driver constitutes a first LED driver for providing driving currents to the LED emitting devices providing the output of tungsten white light and the LED lighting device further comprises a second LED driver for providing driving currents to the LED emitting devices providing the output of daylight white light.

24. The LED lighting device of claim 22, wherein the housing is about four feet long and the lighting device is configured to receive an input wattage of at least 50 watts, the electrical input connection is configured to receive AC input power and has at least one of an inverter and a power supply in the housing and the LED driver is disposed within the housing and is configured to provide up to the at least 50 watts to the LEDs.

25. The LED lighting device of claim 22, wherein the first, second, third and fourth sets of LED light emitting elements are in multiple rows and evenly dispersed along the length of the housing.

26. The LED lighting device of claim 21, wherein the LED driver is adapted for selectively driving each of the first set, second set, third set, and fourth set of LED emitting elements in increments of about $1/255$ to selectively produce at least 255 different colors from the lighting device, wherein the LED driver is adapted for selectively driving each of the first set, second set, third set and fourth set of LED emitting elements in response to DMX signals from an external computer console or lighting control board to selectively produce the at least 255 different colors of an entertainment industry color wheel emitted from the lighting device, wherein there are multiple LED lighting devices, and wherein there is an external controller for the lighting devices, the lighting devices each having a selector mechanism for being individually addressable by the external controller.

* * * * *